United States Patent
Shirane et al.

(10) Patent No.: US 9,311,579 B2
(45) Date of Patent: Apr. 12, 2016

(54) PRINTING APPARATUS

(71) Applicant: SEIKO EPSON CORPORATION, Tokyo (JP)

(72) Inventors: Tatsuya Shirane, Nagano (JP); Toshio Miyake, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/564,496

(22) Filed: Dec. 9, 2014

(65) Prior Publication Data

US 2015/0166282 A1 Jun. 18, 2015

(30) Foreign Application Priority Data

Dec. 13, 2013 (JP) .................. 2013-258528

(51) Int. Cl.
*G06F 3/12* (2006.01)
*G06K 15/00* (2006.01)
*B65H 1/14* (2006.01)
*B65H 7/02* (2006.01)
*B65H 1/04* (2006.01)

(52) U.S. Cl.
CPC .............. *G06K 15/4065* (2013.01); *B65H 1/04* (2013.01); *B65H 1/14* (2013.01); *B65H 7/02* (2013.01); *G06K 15/005* (2013.01); *B65H 2405/324* (2013.01); *B65H 2407/21* (2013.01); *B65H 2511/20* (2013.01); *B65H 2515/704* (2013.01)

(58) Field of Classification Search
None
See application file for complete search history.

(56) References Cited

U.S. PATENT DOCUMENTS

2005/0258586 A1   11/2005  Elenes et al.
2014/0103604 A1*  4/2014   Saito et al. .................... 271/303

FOREIGN PATENT DOCUMENTS

| JP | 2002-278377 A | 9/2002 |
| JP | 2005-330105 A | 12/2005 |
| JP | 2011-121271 A | 6/2011 |

* cited by examiner

*Primary Examiner* — Dov Popovici
(74) *Attorney, Agent, or Firm* — Global IP Counselors, LLP

(57) ABSTRACT

A printer includes a first sensor configured to identify a section to be identified of a movable tray. A computer in the printer drives a motor in a direction where the movable tray heads to a supplying position and stops driving the motor when an impact, where the drive load on the motor exceeds a threshold due to the movable tray hitting a separating mechanism which is at the supplying position, is detected. In addition, the computer drives the motor in a direction where the movable tray heads to a setting position, and stops driving the motor and arranges the movable tray at the setting position when the first sensor is on due to the section to be identified being identified.

7 Claims, 12 Drawing Sheets

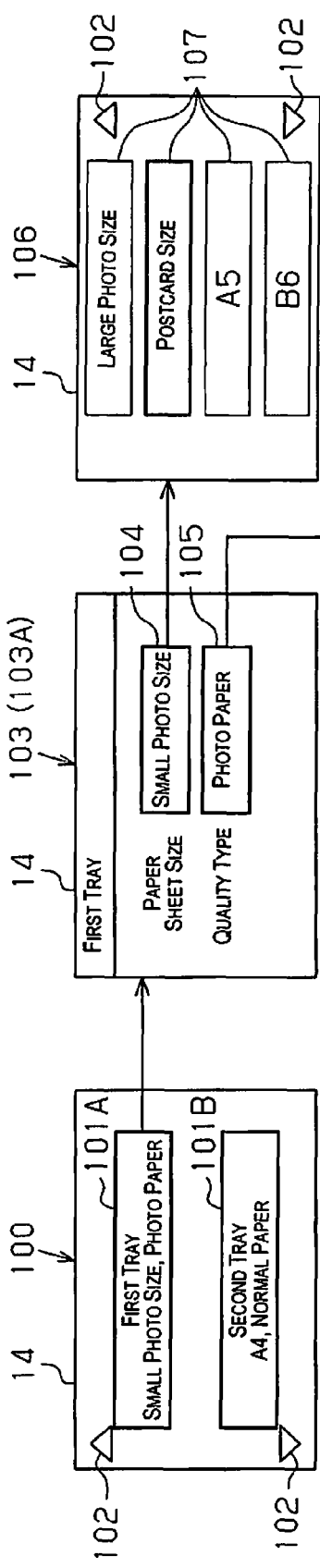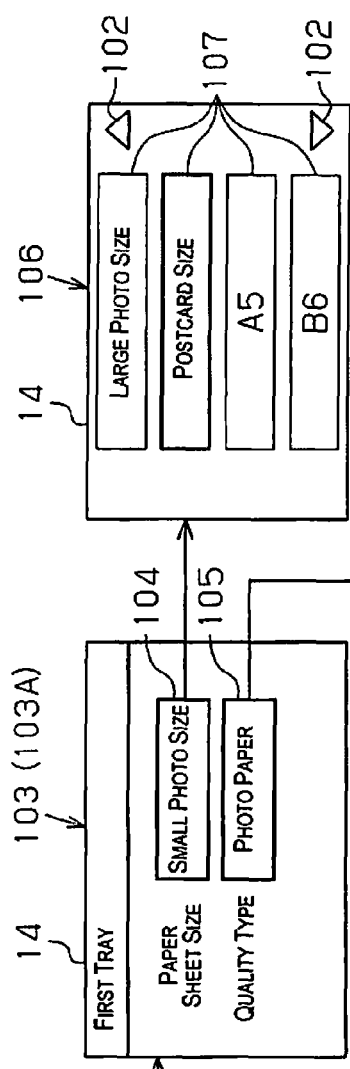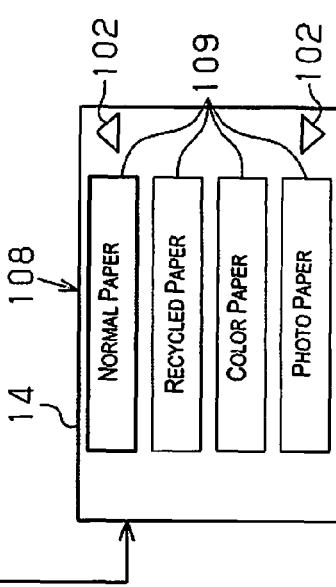

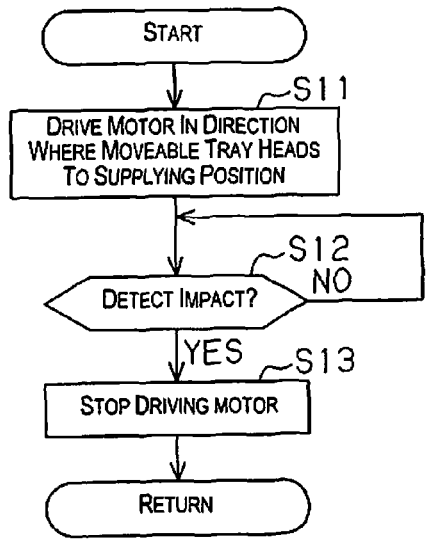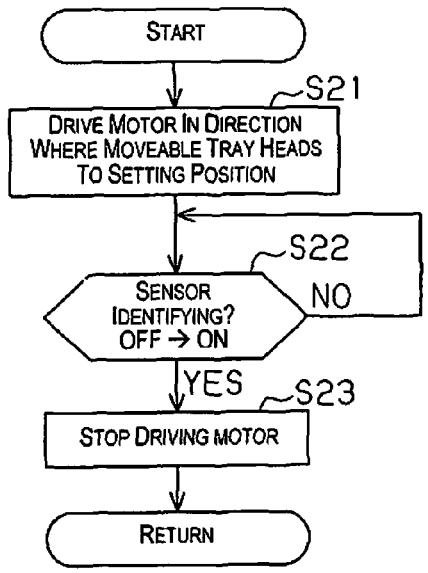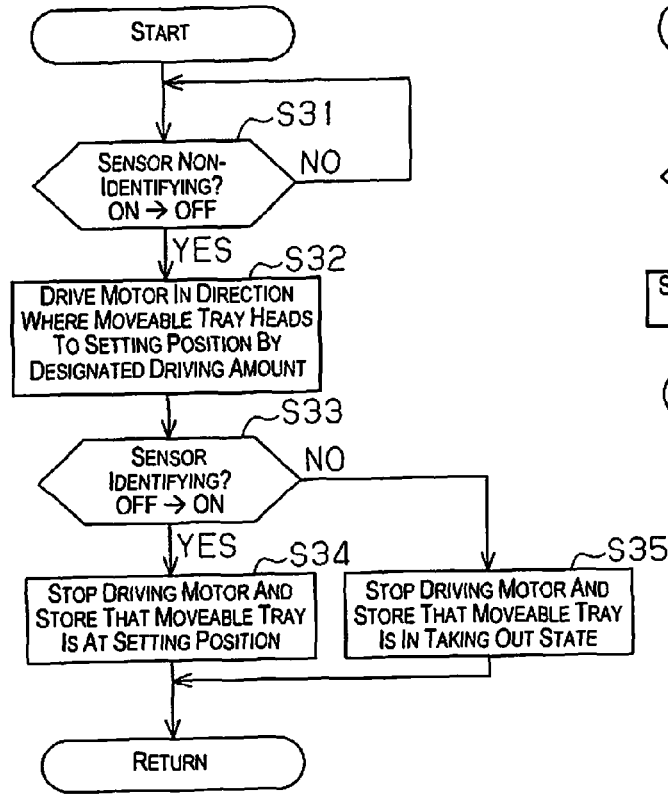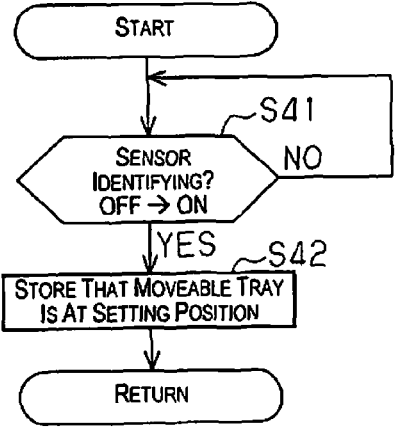
Fig. 11A
Fig. 11B
Fig. 12A
Fig. 12B

PRINTING APPARATUS

CROSS-REFERENCE TO RELATED APPLICATIONS

This application claims priority to Japanese Patent Application No. 2013-258528 filed on Dec. 13, 2013. The entire disclosure of Japanese Patent Application No. 2013-258528 is hereby incorporated herein by reference.

BACKGROUND

1. Technical Field

The present invention relates to a printing apparatus which is provided with a movable tray which accommodates a medium such as paper sheets.

2. Related Art

A system, where a supply tray (a medium accommodating section) with upper and lower levels which supplies paper sheets is provided independently so as attaching and detaching is possible, is disclosed in, for example, Japanese Unexamined Patent Application Publication No. 2005-330105 as this type of printing apparatus. A first tray (a first medium accommodating section) on an upper level is a movable tray, the length of the first tray in a medium feeding direction is shorter than a second tray (a second medium accommodating section) on a lower level, and the first tray automatically moves between a picking position (a supplying position) and a loading position (a setting position). In detail, this system is provided with the first tray which hold a first supply source for paper sheets, a first mechanism which feeds the paper sheets from the first tray to an apparatus by a shaft being rotated in a first direction, and a second mechanism which moves the first tray from the picking position to the loading position by a shaft being rotated in a second direction.

In this type of apparatus, it is difficult for a user to take out the first tray when the first tray which is movable is at the paper supplying position which is at a far side in an apparatus body. However, in the system described above, there is a configuration where, when the first tray is empty or photo printing which is based on a printing job is complete, a driver automatically returns the first tray from the picking position to the loading position. For this reason, it is possible for a user to relatively simply take out the first tray when the first tray is empty or when photo printing is complete and it is possible to smoothly perform, for example, replenishing of paper sheets and replacing of different types of paper sheets with regard to the first tray.

In addition, an image recording apparatus which is provided with a plurality of supply trays (medium accommodating sections) is known where a screen is displayed for inputting the type of paper sheets which are accommodated in the supply trays when mounting the supply trays (for example, Japanese Unexamined Patent Application Publication No. 2002-278377). In this apparatus, it is necessary for it to be possible to detect mounting of the supply trays into the apparatus body.

Here, in the printing apparatus described in Japanese Unexamined Patent Application Publication No. 2005-330105, it is necessary to ascertain the position of a movable tray in order for a control section to control the movable tray as with the first tray and at least two sensors are necessary in order to identify the mounting position (the setting position) and the supply position. Furthermore, there is a problem in that the number of sensors which are necessary increase if the position states which are targets for detection increase such as in a case where it is necessary to detect mounting of the supply tray or in a case where it is necessary to detect taking out of the supply tray as in Japanese Unexamined Patent Application Publication No. 2002-278377. Due to these circumstances, it is desirable to have a printing apparatus where it is possible to suppress the number of sensors which are used as much as possible while detecting a plurality of the position states which are necessary in controlling the movable tray.

SUMMARY

The present invention is carried out in order to solve these problems and has an object of providing a printing apparatus where it is possible to detect a plurality of position states for a movable medium accommodating section which are necessary in controlling the printing apparatus even using sensors which are fewer in number than the number of position states which are targets for detection.

Means for solving the problems described above and the operational effects thereof will be described below.

A printing apparatus which solves the problems described above is provided with a movable medium accommodating section configured to accommodate a medium, having a section to be identified configured to identify a position of the movable medium accommodating section, and configured to move between a setting position where the medium accommodating section is set in the body of the printing apparatus and a supplying position where the medium which is accommodated in the medium accommodating section is supplied, a sensor configured to identify the section to be identified, a driving section configured to drive the medium accommodating section to move between the setting position and the supplying position, a regulating section configured to regulate further movement when the medium accommodating section reaches the supplying position, and a control section configured to detect that the medium accommodating section is at the setting position by the sensor identifying the section to be identified and detect that the medium accommodating section has reached the supplying position when the medium accommodating section hits the regulating section and a drive load on the driving section exceeds a threshold.

According to this configuration, the setting position is detected by the sensor identifying the section to be identified of the medium accommodating section and the medium accommodating section reaching the supplying position is detected when the medium accommodating section hits the regulating section and the drive load on the driving section exceeds a threshold. As such, it is possible to detect a plurality of the position states for the movable medium accommodating section which are necessary in controlling the printing apparatus even using sensors which are fewer in number than the plurality of position states which include the setting position and the supplying position of the movable medium accommodating section. For this reason, it is possible to suppress the number of parts in the printing apparatus as much as possible.

In addition, in the printing apparatus described above, it is preferable that, when the driving section is not driving the medium accommodating section, the control section be configured to detect taking out of the medium accommodating section when the sensor switches from an identifying state where the section to be identified is identified to a non-identifying state where the section to be identified is not identified and detect mounting of the medium accommodating section when the sensor switches from the non-identifying state to the identifying state.

According to this configuration, taking out of the medium accommodating section is detected when the sensor switches from the identifying state to the non-identifying state when the driving section is not driving the medium accommodating section. In addition, mounting of the medium accommodating section is detected when the sensor switches from the non-identifying state to the identifying state when the driving section is not driving the medium accommodating section. As such, it is possible to detect a plurality of the position states of the movable medium accommodating section which are necessary in controlling the printing apparatus even using sensors which are fewer in number than the plurality of position states which further include taking out and mounting of the movable medium accommodating section.

In the printing apparatus described above, it is preferable that the control section be further configured to detect taking out of the medium accommodating section when the driving section drives the medium accommodating section to move to the setting position and the sensor is not in the identifying state even after driving with a predetermined driving amount when the sensor switches from the identifying state where the section to be identified is identified to the non-identifying state where the section to be identified is not identified while the driving section is not driving the medium accommodating section.

According to this configuration, there are cases, although rare, where a user pushes in the medium accommodating section deep into the body of the printing apparatus as a case where the sensor switches from the identifying state to the non-identifying state other than when taking out the medium accommodating section when the driving section is not driving the medium accommodating section. In this case, the sensor is in the identifying state after driving for a predetermined driving amount when the driving section is driven so that the medium accommodating section is to be moved to the setting position after the sensor switches from the identifying state to the non-identifying state. In contrast to this, the sensor is not in the identifying state even after driving with a predetermined driving amount in a case where the medium accommodating section is taken out. For this reason, taking out of the medium accommodating section is detected when the sensor is not in the identifying state even after driving with a predetermined driving amount. As such, it is possible to correctly detect taking out of the medium accommodating section without mistakes in cases where the medium accommodating section is pushed in.

In addition, in the printing apparatus described above, it is preferable that, in a case where the section to be identified is a first section to be identified, one or more of a second section to be identified be further provided such that the number, which is provided at a position more to an insertion direction side than the first section to be identified of the medium accommodating section, is more than the number which is provided at a position on a taking out direction side, and that the control section be further configured to detect mounting of the medium accommodating section when a total number of the number of the second sections to be identified which is provided on the insertion direction side and the number of the first section to be identified is the same as the number of time that the sensor is in the identifying state while the driving section is not driving the medium accommodating section.

According to this configuration, it is not possible to distinguish mounting of the medium accommodating section or pulling back from the supply position side only by the result of identifying by the sensor since the sensor switches from the non-identifying state to the identifying state also in a case where a user pulls back the medium accommodating section, which is pushed toward the supply position side, to the setting position if there is a configuration where, for example, there is only one of the sections to be identified for identifying the setting position. However, it is possible for a user to more correctly detect mounting of the medium accommodating section by differentiating mounting and pulling back of the medium accommodating section using the number of identifications by the sensors since the number of the second sections to be identified which are provided at positions more to the insertion direction side than the first section to be identified of the medium accommodating section is more than the number of the second sections to be identified which are provided at positions on the taking out direction side.

In the printing apparatus described above, it is preferable that, in a case where the section to be identified is a first section to be identified, one or more of a second section to be identified be further provided such that the number which is provided at a position more to an insertion direction side than the first section to be identified of the medium accommodating section is more than the number which is provided at a position on a taking out direction side, and that the control section be further configured to detect taking out of the medium accommodating section when the sensor switches from the identifying state to the non-identifying state when the driving section is not driving the medium accommodating section and the number of the second section to be identified which is provided on the insertion direction side is the same as the number of time that the sensor is in the identifying state.

According to this configuration, it is not possible to distinguish taking out of the medium accommodating section or pushing in to the supplying position side only by the result of identifying by the sensor since the sensor switches from the identifying state to the non-identifying state also in a case where a user pushes in the medium accommodating section from the setting position toward the supplying position side if there is a configuration where, for example, there is only one of the sections to be identified for identifying the setting position. However, it is possible for a user to more correctly detect taking out of the medium accommodating section by differentiating taking out and pushing in of the medium accommodating section using the number of identifications of the second sections to be identified by the sensors since the number of the second sections to be identified which are provided at positions more to the insertion direction side than the first section to be identified of the medium accommodating section is more than the number of the second sections to be identified which are provided at positions on the taking out direction side.

In addition, in the printing apparatus described above, it is preferable that, in a case where the movable medium accommodating section is a first medium accommodating section and the sensor is a first sensor, the printing apparatus further comprise a second medium accommodating section configured to accommodate a medium and a second sensor which configured to identify an end portion of the second medium accommodating section on a downstream side of an insertion direction into the body of the printing apparatus when the second recording medium accommodating section is mounted in the body of the printing apparatus, and that the control section be configured to detect mounting of the second medium accommodating section into the body of the printing apparatus when the second sensor identifies the end portion of the second medium accommodating section, that the second medium accommodating section be positioned at a lower section of the first medium accommodating section, and that the setting position and the supplying position of the second medium accommodating section be the same.

According to this configuration, it is possible for the control section to detect mounting of the second medium accommodating section by the second sensor identifying the end portion of the second medium accommodating section when the user mounts the second medium accommodating section into the apparatus body. In addition, it is not necessary to separately provide a member to be identified since the target for detection for the second sensor is the end portion of the second medium accommodating section on the downstream side of the insertion direction into the body of the printing apparatus.

In addition, in the printing apparatus described above, it is preferable that there be provided a display section configured to prompt inputting of medium information which includes at least one out of a type and a size of the medium using a display, an operating section configured to be operated in order to input the medium information, and a memory section configured to store the medium information so as to be associated with the medium accommodating section which is mounted, and that the control section be further configured to display content which prompts inputting of the medium information, which relates to the medium which is accommodated in the medium accommodating section which is mounted, on the display section when detecting that the medium accommodating section is mounted in the body the printing apparatus and store the medium information which is input from the operating section in the memory section to be associated with the medium accommodating section where mounting is detected.

According to this configuration, inputting of the medium information, which relates to the medium which is accommodated in the medium accommodating section which is mounted, is prompted using the display section if it is detected that either of the medium accommodating sections are mounted in the apparatus body. A user inputs the medium information by operating the operating section. When the medium information is input from the operating section, the control section stores the medium information which is input from the operating section in the memory section to be associated with the medium accommodating section where mounting is detected.

In addition, in the printing apparatus described above, it is preferable that the control section be configured to display guidance other than the content which prompts inputting of the medium information, on the display section when detecting that the medium accommodating section is taken out of the body of the apparatus.

According to this configuration, when a user takes out either of the medium accommodating sections from the apparatus body, other guidance which is not the content which prompts inputting of the medium information is displayed on the display section using the control section which identifies the taking out. As such, it is possible for a user to correctly accommodate the medium in the medium accommodating section in accordance with the guidance which is displayed. Here, examples of the guidance include guidance on the operations of the orientation in which the medium is set in the medium accommodating section, of the positioning of a medium guide, which is provided in the medium accommodating section, to match the medium size, and the like.

BRIEF DESCRIPTION OF THE DRAWINGS

Referring now to the attached drawings which form a part of this original disclosure:

FIGS. 10A to 10D are diagrams illustrating transition of a setting screen where the corresponding relationship between the supply tray and the type of paper sheets is set;

FIG. 11A is a flow chart illustrating a processing routine when a movable tray is moved to a supplying position;

FIG. 11B is a flow chart illustrating a processing routine when a movable tray is moved to a setting position;

FIG. 12A is a flow chart illustrating a processing routine when taking out of a movable tray is detected;

FIG. 12B is a flow chart illustrating a processing routine when mounting of a movable tray is detected;

DETAILED DESCRIPTION OF EXEMPLARY EMBODIMENTS

Embodiments detailing a printer which is an example of a printing apparatus will be described below with reference to the diagrams.

Figure 1:
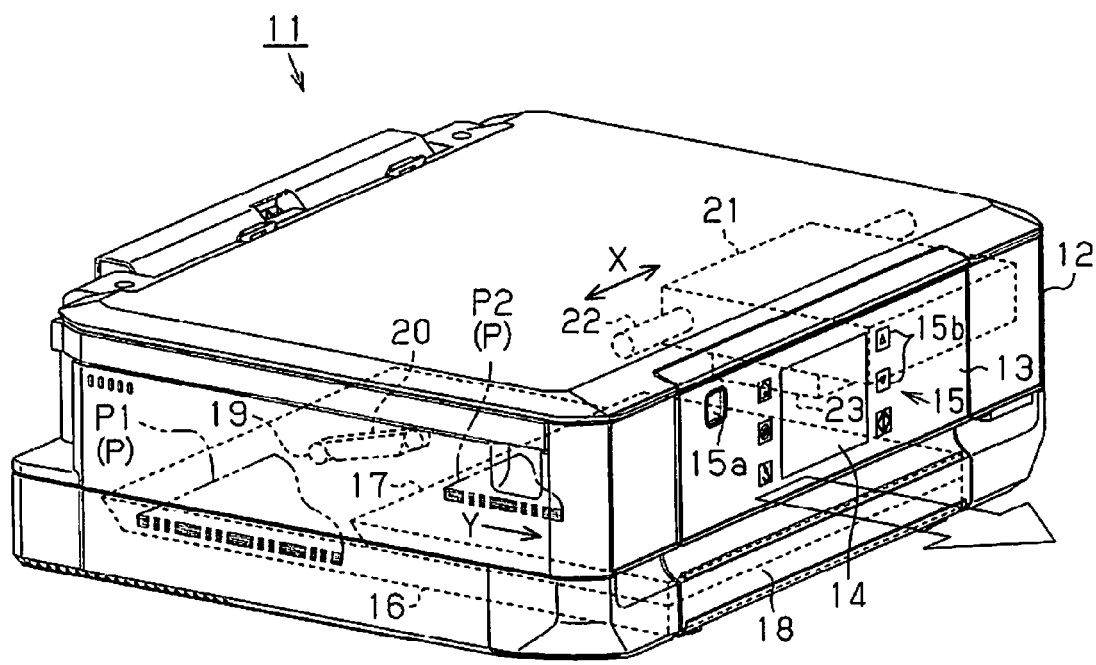
FIG. 1 is a perspective diagram illustrating a printing apparatus according to a first embodiment.

As shown in FIG. 1, a printer 11 is an ink jet color printer as an example and is provided with an apparatus body 12 which has substantially a thin rectangular cubic shape. An operating panel 13, which is used by a user in inputting operations and the like, is provided in a front surface of the apparatus body 12 (a right surface in FIG. 1).

For example, a display section 14, which is formed using a liquid crystal panel, and an operating section 15, which is formed from a plurality of operation switches, are provided in the operating panel 13. A power source switch 15a for operating on and off of the power source of the printer 11, a selection switch 15b for operating to select a desired selection item on a menu screen which is displayed in the display section 14, and the like are included in the operating section 15.

As shown in FIG. 1, supply trays 16 and 17 (supply cassettes) with upper and lower levels, where it is possible for a plurality of paper sheets P which are an example of a medium to be accommodated, are independently mounted in a position on the lower side of the operating panel 13 which is in the front surface of the apparatus body 12 in a state so as to be able to be attached and detached (so as to be able to be inserted and extracted). The supply tray (referred to below as a "lower level tray 16") which is arranged on the lower side out of the supply trays 16 and 17 is provided with a cover 18 on the front surface side (the right surface in FIG. 1) to be able to be opened and closed with a lower end section as a rotation shaft and it is possible for the whole of the cover 18 to be extracted. In addition, the supply tray (referred to below as a "movable tray 17") which is arranged on the upper side out of the supply trays 16 and 17 is mounted in a state so as to be able to be attached and detached in a mounting opening which is exposed due to, for example, the cover 18 being opening in a state where the lower level tray 16 is mounted. Here, in the present embodiment, an example of a movable medium accommodating section (a first medium accommodating section) is configured using the movable tray 17 and an example of a second medium accommodating section is configured using the lower level tray 16.

In the present embodiment, it is possible for paper sheets P1 with a relative large paper sheet size to be accommodated in the lower level tray 16. The lower level tray 16 has a length which is slightly shorter than the total length of the printer 11 in a transport direction Y (depth length) and has a width which is slightly longer than the width of the largest paper sheet in a width direction X. On the other hand, it is possible for paper sheets P2 with a relative small paper sheet size to be accommodated in the movable tray 17. The movable tray 17 has a length which is slightly shorter than the total length of the lower level tray 16 in the transport direction Y and has a width which is substantially the same as the lower level tray 16 in the width direction X. In the present example, the length of the movable tray 17 in the transport direction Y is, for example, approximately two-thirds of the length of the lower level tray 16 in the transport direction 16. It is obvious that it is possible for the ratio of the lengths of the lower level tray 16 and the movable tray 17 in the transport direction Y to be set to an appropriate value as long as the movable tray 17 is shorter.

The movable tray 17 in the present embodiment is electrically powered so that it is possible to move back and forth in a direction which is parallel to the transport direction Y and is able to move between a setting position (a mounting position), where attaching and detaching by a user is possible and where the front surface is positioned at a position on the rear surface side near to the cover 18 which is in a closed state as shown in FIG. 1, and a supplying position which is positioned on the far side (the left side in FIG. 1) only a predetermined distance from the setting position into the apparatus body 12. As such, it is possible for a user to extract the movable tray 17 if the cover 18 is open in a state where the movable tray 17 is positioned at the setting position. In contrast to this, it is extremely difficult for the movable tray 17 to be taken out in a state where, for example, the movable tray 17 is arranged at the supplying position which is positioned deep into the apparatus body 12 since it is not possible for a user to grasp the movable tray 17.

As shown in FIG. 1, a pickup roller 19 (also refer to FIG. 5) is arranged at a position in the apparatus body 12 to be deeper than a central section in the width of each of the trays 16 and 17 in a state where a tip end section of a swinging member 20 is supported so as to be able to rotate. The pickup roller 19 is provided to be shared between the lower level tray 16 and the movable tray 17. Here, an example of a supplying section is configured in the present embodiment using the pickup roller 19, the swinging member 20, and the like.

As shown in FIG. 1, the pickup roller 19 abuts with the single uppermost paper sheet out of the paper sheets P1 which are accommodated in the lower level tray 16 due to the swinging member 20 being tilted so that the tip end section of the swinging member 20 moves downward when the movable tray 17 is at the setting position. In this state, the paper sheet P1 which is the single uppermost paper sheet is sent out from the lower level tray 16 to the downstream side in a supply direction by the pickup roller 19 being rotated. In addition, the swinging member 20 is pushed up by the movable tray 17 and the pickup roller 19 abuts with the single uppermost paper sheet out of the paper sheets P2 which are accommodated in the movable tray 17 when the movable tray 17 is at the supplying position. In this state, the paper sheet P2 which is the single uppermost paper sheet is sent out from the movable tray 17 to the downstream side in the supply direction by the pickup roller 19 being rotated. The paper sheets P which are supplied from either of the trays 16 and 17 are transported in the transport direction Y along a predetermined transport path after being reversed along a guide with an arc surface shape at a back section in the apparatus body 12. Here, in the present specifications, a reference numeral "P1" is given to the paper sheets which are accommodated in the lower level tray 16 and a reference numeral "P2" is given to the paper sheets which are accommodated in the movable tray 17, but simply "paper sheets P" represents cases where it is not particularly necessary for the tray which accommodates the paper sheets to be differentiated.

As shown in FIG. 1, a carriage 21 is provided in the apparatus body 12 so as to be guided by a guide shaft 22 which is provided to span so as to extend in a main scanning direction X (the width direction in the present example) which intersects with the transport direction Y in a state where it is possible to move back and forth along the main scanning direction X. A recording head 23, which has a plurality of nozzles which eject ink droplets into the paper sheets P which are being transported, is attached at a lower section of the carriage 21. The paper sheets P where printing is complete are discharged from a discharge opening which is exposed in a state where the operating panel 13 and the cover 18 are open in a direction which is indicated by the white arrow in FIG. 1. The discharged paper sheets P where printing is complete are stacked on a discharge stacker 24 (a discharge tray) (refer to FIG. 5) which is arranged in a jutting state by being provided to be able to go in and out from the lower side toward the front of the discharge opening which is on the front side of the apparatus body 12.

Figure 2:
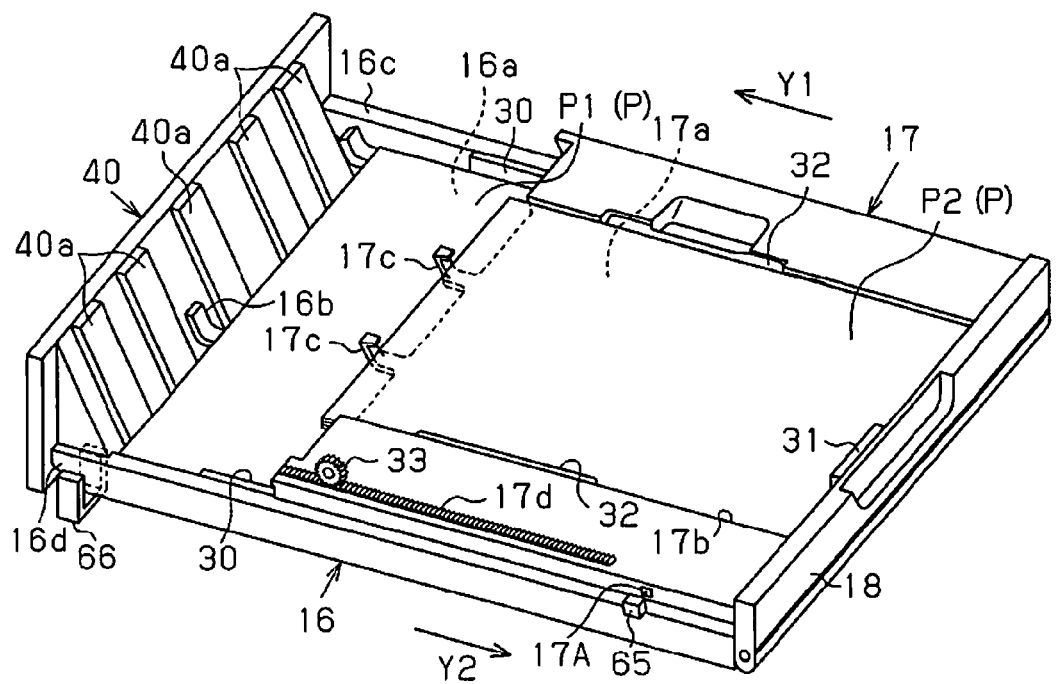
FIG. 2 is a perspective diagram illustrating a state where a movable tray is arranged at a setting position.

The configuration of each of the trays 16 and 17 and a separating mechanism for the paper sheets P will be described next. As shown in FIG. 2, the lower level tray 16 has a bottom surface 16a which it is possible to place the paper sheets P1 and an edge guide 29 (refer to FIG. 5) which regulates the position of a back end edge of the paper sheet P is provided at an end section position on the cover 18 side of the bottom surface 16a so as to be able to slide in an insertion direction Y1. In addition, a pair of edge guides 30 which regulate the positions of side edges of the paper sheets P1 are provided in the lower level tray 16 so as to be able to slide in a paper sheet width direction (which is the same as the width direction X in FIG. 1) which intersects with a tray insertion direction. In the present embodiment, the center of the width of the paper sheets in the lower level tray 16 are guided to a center position which matches with the center of the width of the lower level tray 16.

In addition, a stopper 16b, which regulates the tip end of the paper sheets P1 which are set, is provided at a tip end section of the lower level tray 16 in a mounting direction (a left end section in FIG. 2). Furthermore, a pressure section 16c is provided at a tip end section of the lower level tray 16 so as to be able to release holding by engaging with a holding mechanism (which is not shown in the diagrams) of the swinging member 20 (refer to FIG. 1) in a process where the lower level tray 16 is mounted in the apparatus body 12.

The pickup roller 19 is lowered and abuts with the paper sheet P1 which is the uppermost sheet in the lower level tray 16 due to releasing of the holding mechanism of the swinging member 20.

On the other hand, the movable tray 17 is provided with an accommodating recess section 17b which has a bottom surface 17a where it is possible to place the paper sheets P2 as shown in FIG. 2. An edge guide 31 is provided in the bottom surface 17a at an end section on the front side in the tray mounting direction (a right end section in FIG. 2) so as to be able to slide in the insertion direction Y1. In addition, a pair of edge guides 32 are provided in the accommodating recess section 17b so as to be able to regulate the positions of side edges of the paper sheets P2 from both sides by sliding in a paper sheet width direction. In the present embodiment, the paper sheets P2 in the movable tray 17 are guided to a center position in the width direction of the movable tray 17 using the pair of edge guides 32.

In addition, a pair of stoppers 17c, which regulate the position of the tip end of the paper sheets, are provided in the movable tray 17 at a tip end section in the mounting direction (a left end section in FIG. 2) and there is a configuration where the paper sheets P2 which are set in the movable tray 17 do not jump out to the front end side due to the pair of stoppers 17c. The stoppers 17c push the swinging member 20 back upward by engaging with the swinging member 20 and the pickup roller 19 abuts with the paper sheet P2 which is the uppermost paper sheet in the movable tray 17 in a state where the movable tray 17 is arranged at the supplying position in a process where the movable tray 17 is moved from the setting position to the supplying position.

In addition, as shown in FIG. 2, a rack section 17d with a designated length, which extends along the movement direction (the tray insertion direction) of the movable tray 17, is formed on an upper surface at one end section of the movable tray 17 in the width direction W. A rack and pinion mechanism is configured by the rack section 17d meshing with a pinion gear wheel 33. The movable tray 17 moves between the setting position (FIG. 5) shown in FIG. 2 and the supplying position (FIG. 6) shown in FIG. 3 by changing the meshing position of the rack section 17d and the pinion gear wheel 33 which rotates due to motive power from a transport motor 43 (refer to FIG. 9) which is a motive power source in the transport system which transports the paper sheets P2.

In addition, as shown in FIG. 2, the separating mechanism 40, which separates the paper sheet P which is the uppermost paper sheet which is sent out from the lower level tray 16 or the movable tray 17 due to rotating of the pickup roller 19, is arranged at a location, which corresponds to a tip end section of the lower level tray 16 which is mounted in the tray accommodating recess section described above, in the bottom surface section of the apparatus body 12. The separating mechanism 40 has a plurality of separating sections 40a in the width direction of the apparatus body 12. Each of the separating sections 40a has an inclined surface which is formed with an acute angle with regard to a direction for sending out paper sheets from the trays 16 and 17 (the insertion direction Y1) and has a function of separating the uppermost paper sheet P from the paper sheets below using frictional resistance with the inclined surface or the like. In this manner, one sheet at a time of the paper sheets P are supplied from the lower level tray 16 or the movable tray 17.

Figure 3:
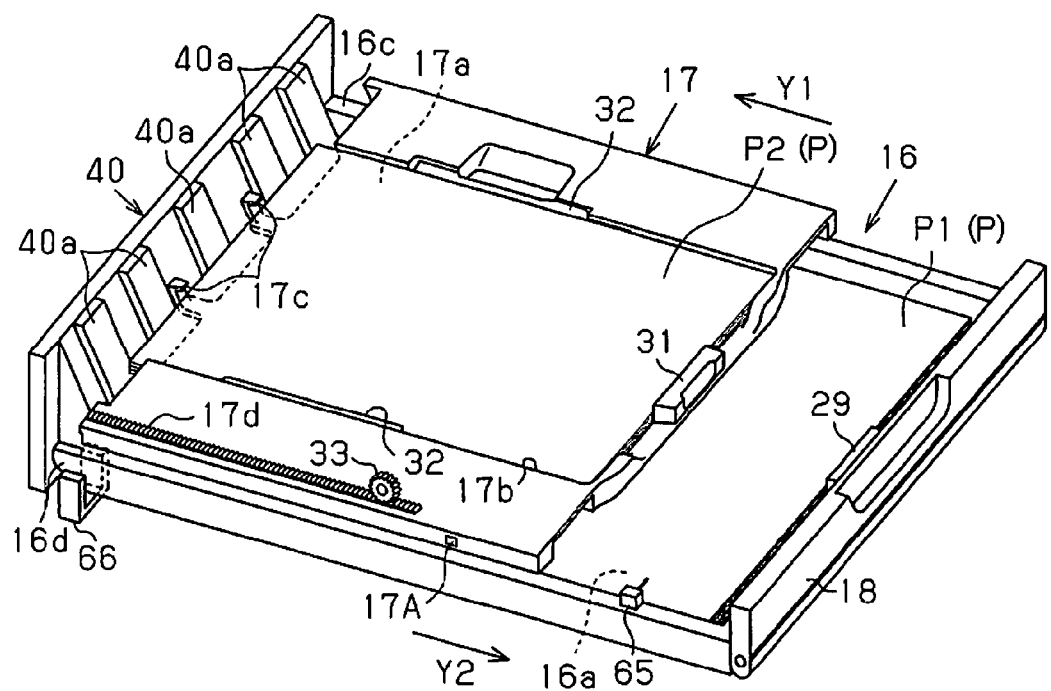
FIG. 3 is a perspective diagram illustrating a state where a movable tray is arranged at a supplying position.

Here, the movable tray 17 is moved from the setting position shown in FIG. 2 in the insertion direction Y1 and is arranged at the supplying position shown in FIG. 3 due to being stopped at a position with a state where further movement is regulated due to hitting against the separating mechanism 40. In addition, a first sensor 65 is provided in the apparatus body 12 at a position where it is possible for a section to be identified 17A which is provided in a side section of the movable tray 17 to be identified when the movable tray 17 reaches the setting position by being moved from the supply position shown in FIG. 3 in a taking out direction Y2. Then, the movable tray 17 is stopped at the setting position shown in FIG. 2 when driving of the transport motor 43 which is a motive power source for the movable tray 17 is stopped based on identifying by the first sensor 65. Here, in the present embodiment, the first sensor 65 is configured as an example of a sensor and a first sensor.

In addition, the setting position of the movable tray 17 is a position for performing taking out and mounting of the movable tray 17 when the user replaces or replenishes the paper sheets P2. For this reason, the movable tray 17 is moved to the setting position shown in FIG. 2 and waits other than when supplying is particularly necessary.

Figure 4:
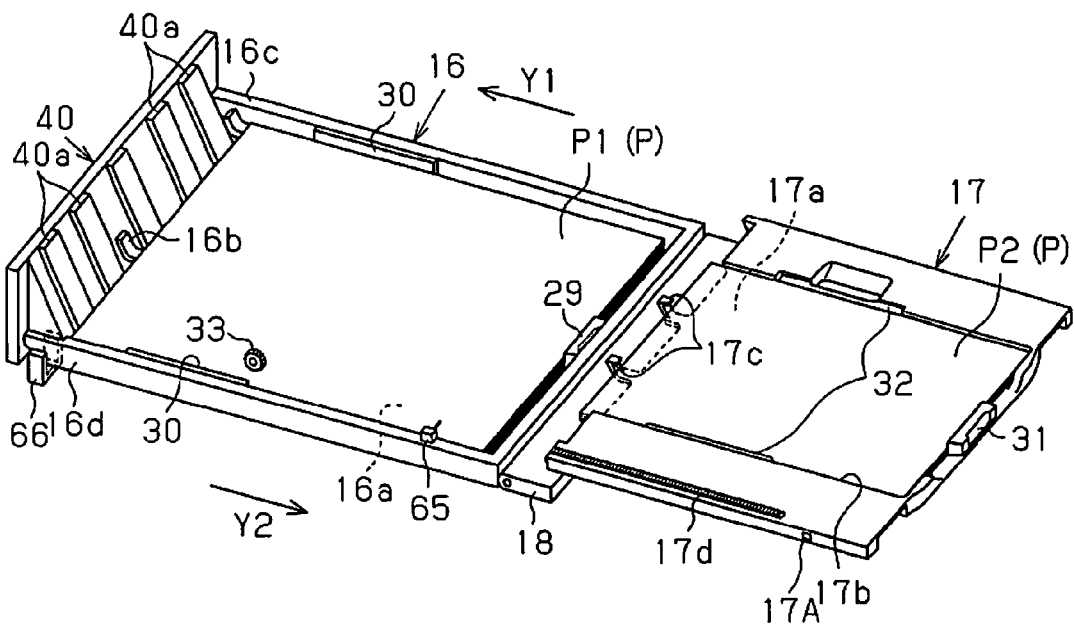
FIG. 4 is a perspective diagram illustrating a state where a movable tray is taken out.

Then, a user takes out the movable tray 17 which is at the setting position from the apparatus body 12 by grasping the movable tray 17 and performs replacing or replenishing of the paper sheets P2 in a state shown in FIG. 4 where the movable tray 17 is taken out. Then, when replacing or replenishing of the paper sheets P2 in the movable tray 17 is finished, the user returns the movable tray 17 which is in a state of being taken out to the setting position by mounting the movable tray 17 into the apparatus body 12.

In addition, as shown in FIG. 2 and FIG. 3, a protruding section 16d which protrudes in the insertion direction Y1 is formed at one end in the width direction which is a tip end section of the lower level tray 16 in the insertion direction Y1. As shown in FIG. 2 and FIG. 3, a second sensor 66, which is an example of a second sensor which is able to identify the protruding section 16d, is provided in the vicinity of the protruding section 16d in a state where the lower level tray 16 is mounted. The second sensor 66 is, for example, an optical sensor which is provided with a light emitting section and a light receiving section, is on due to the protruding section 16d being inserted between the light emitting section and the light receiving section, and is off when the second protruding section 16d is extracted from between the light emitting section and the light receiving section. A controller 60 (refer to FIG. 9) detects mounting of the lower level tray 16 when the second sensor 66 identifies the protruding section 16d and detects taking out of the lower level tray 16 when the second sensor 66 no longer identifies the protruding section 16b.

A tray accommodating recess section (which is not shown in the diagrams) which extends along the depth direction of the apparatus body 12 is provided to be recessed in the apparatus body 12 shown in FIG. 1 on a lower side of the operating panel 13. A lower section guide rail (which is not shown in the diagrams), which guides the lower level tray 16 in an attaching and detaching direction, and an upper section guide rail (which is not shown in the diagrams), which guides the movable tray 17 in the attaching and detaching direction, are provided in inner wall sections on both sides on the right and left in the tray accommodating recess section. Then, it is possible for the user to mount and take out the lower level tray 16 by sliding the lower level tray 16 along the lower section guide rail and it is possible for the user to mount and take out the movable tray 17 by sliding the movable tray 17 along the upper section guide rail. In addition, the movable tray 17 is moved between the setting position (FIG. 2) and the supplying position (FIG. 3) along the upper section guide rail when being driven using motive power from the transport motor 43.

Figure 5:
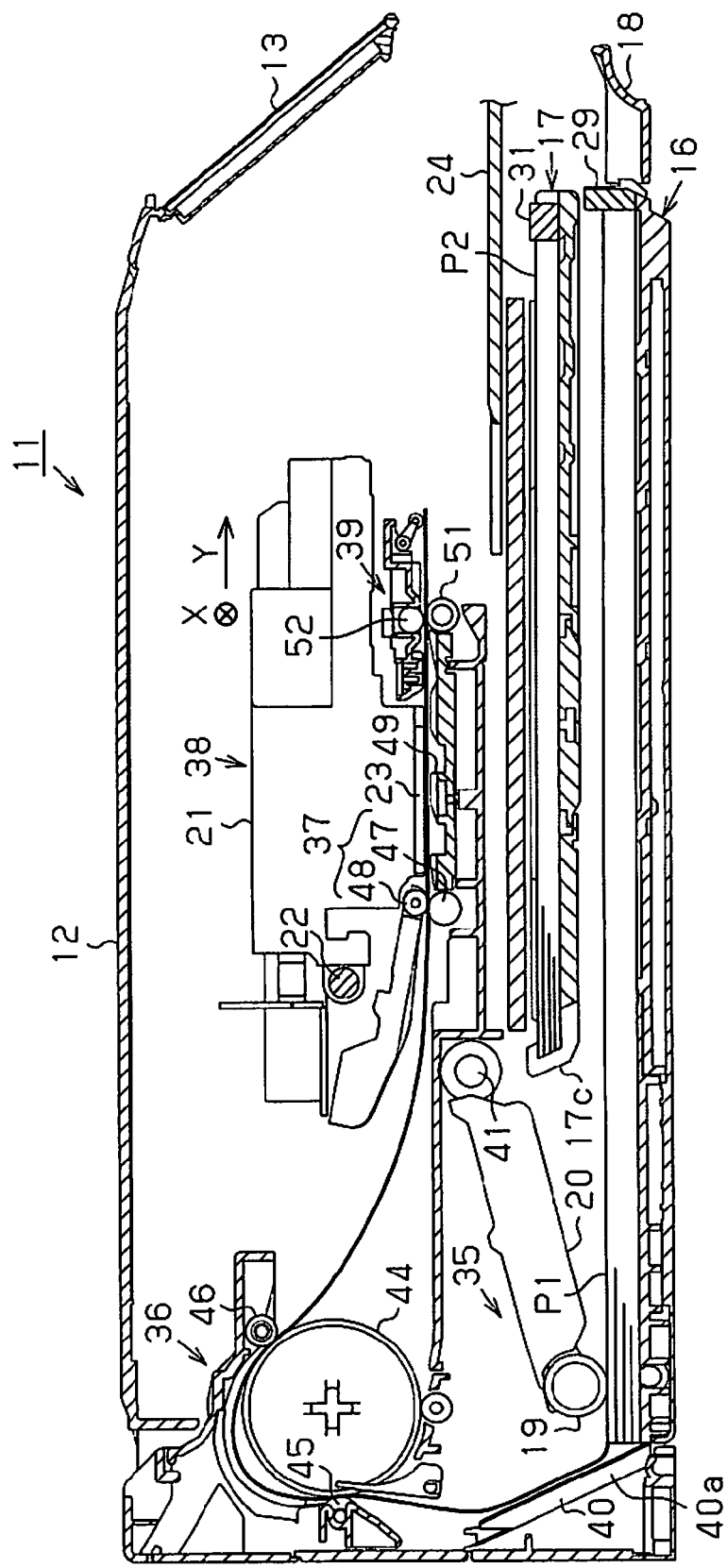
FIG. 5 is a schematic side cross section diagram of a printing apparatus when a movable tray is at a setting position.
Figure 6:
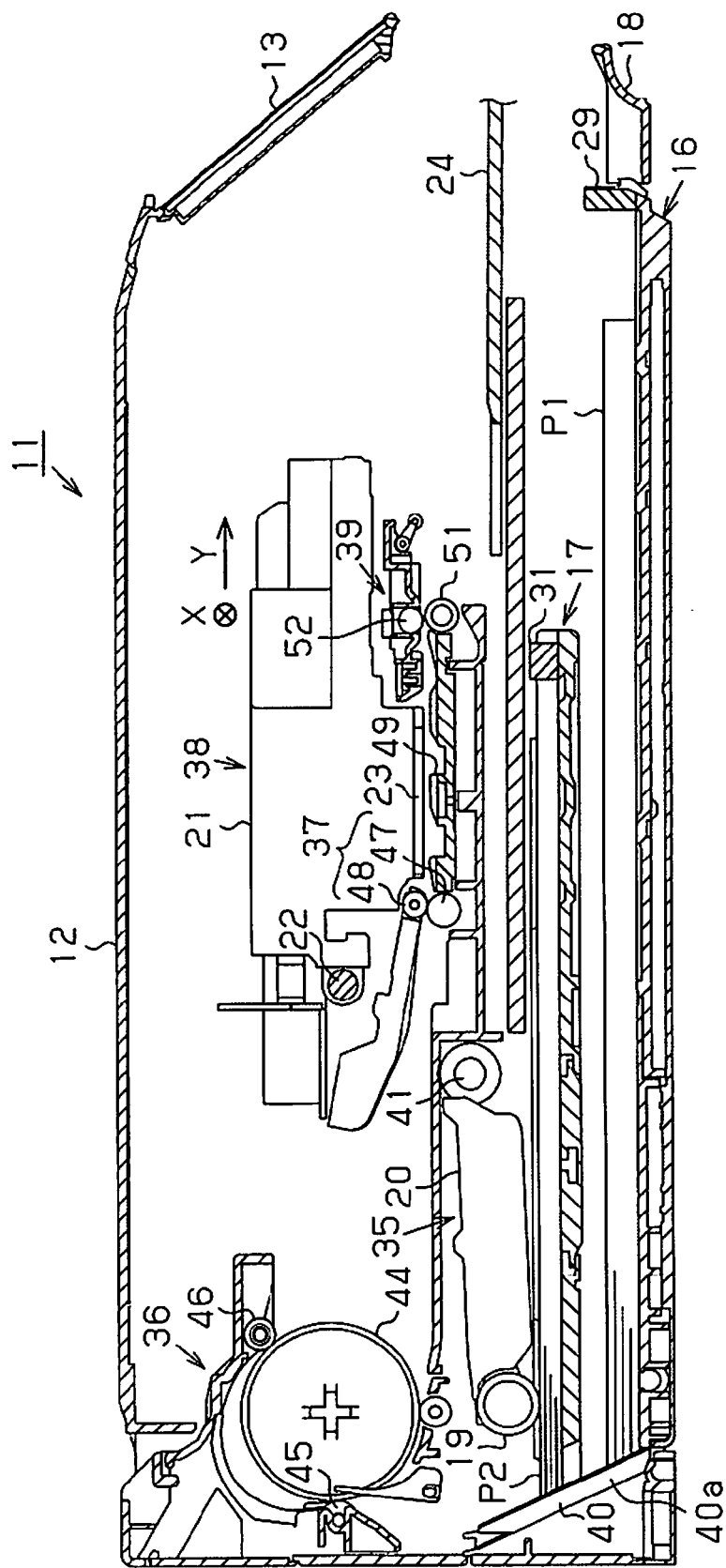
FIG. 6 is a schematic side cross section diagram of a printing apparatus when a movable tray is at a supplying position.

A detailed configuration of the printer 11 will be described next using FIG. 5 and FIG. 6. As shown in FIG. 5 and FIG. 6, the apparatus body 12 is provided with a tray supplying section 35, a medium supplying section 36, a medium transporting section 37, a recording section 38, and a feeding section 39. The tray supplying section 35 is provided with the lower level tray 16, the movable tray 17, the pickup roller 19, and the separating mechanism 40 described above which is provided at a position which opposes the front tip of the paper sheets P which are accommodated in each of the trays 16 and 17.

It is possible for the lower level tray 16 and the movable tray 17 to respectively accommodate a plurality of the paper sheets P1 and P2 and it is possible for the lower level tray 16 and the movable tray 17 to be independently attached and detached with regard to the apparatus body 12. The movable tray 17 is moved between the setting position (FIG. 5) and the supplying position (FIG. 6) due to motive power from the transport motor 43 (refer to FIG. 9).

As shown in FIG. 5 and FIG. 6, the pickup roller 19 is attached, in a state of being able to rotate, to the tip end section of the swinging member 20, which is supported by a support frame (which is not shown in the diagram) in the apparatus body 12, so as to be able to swing centered on a swinging shaft 41. The pickup roller 19 is driven to rotate due to motive power from the transport motor 43 being transferred via a gear train in the swinging member 20. The swinging member 20 has a holding mechanism (which is not shown in the diagrams), which is able to hold the pickup roller 19 at an intermediate position by being provided at a position where engaging with the pressure section 16c in the lower level tray 16 is possible, and a cam follower (which is not shown in the diagrams) which is provided at a position where engaging with the stoppers 17c in the movable tray 17 is possible.

The pickup roller 19 is lowered to a position of coming into contact with the paper sheet P1 on the lower level tray 16 when the pressure section 16c which is at a tip end section engages with the holding mechanism (which is not shown in the diagram) and the holding of the pickup roller 19 using the holding mechanism is released while the lower level tray 16 is being inserted in the apparatus body 12. For this reason, when the movable tray 17 is at the setting position (a retreat position) shown in FIG. 5, the pickup roller 19 abuts with the uppermost paper sheet P1 in the lower level tray 16 and the uppermost paper sheet P1 is sent out from the lower level tray 16 to the downstream side in a supply path when the pickup roller 19 is rotated due to driving of the transport motor 43 in this state.

In addition, the stoppers 17c (refer to FIG. 2 and FIG. 5) which are at a tip end section push the swinging member 20 back upward by engaging with the cam follower (which is not shown in the diagram) of the swinging member 20 in a process where the movable tray 17 is moved from the setting position (FIG. 5) to the supplying position (FIG. 6). When the engaging of the stoppers 17c and the cam follower is released due to the movable tray 17 further progressing toward the supplying position, the pickup roller 19 is lowered to a position of coming into contact with the uppermost paper sheet P2 on the movable tray 17 (FIG. 6). For this reason, as shown in FIG. 6, the pickup roller 19 abuts with the single uppermost paper sheet P2 in the movable tray 17 when the movable tray 17 is at the supplying position. The paper sheet P2 is sent out when the pickup roller 19 is rotated due to driving of the transport motor 43 in this state. In addition, the uppermost paper sheet P which is sent out from either of the trays 16 and 17 is separated from the paper sheets P below using the separating sections 40a.

As shown in FIG. 5 and FIG. 6, the medium supplying section 36, which is provided on the downstream side of the separating mechanism 40 in the supply path, is provided with a supplying drive roller 44, which is driven using the transport motor 43, and supplying driven rollers 45 and 46. The paper sheet P which is interposed between the supplying drive roller 44 and the supplying driven roller 46 is transported to the medium transporting section 37. The medium transporting section 37 is provided with a transporting drive roller 47 which is driven by the transport motor 43 in the same manner and a transporting driven roller 48 which rotates by being driven due to pressure contact with the transporting drive roller 47. The paper sheet P is sent further to the downstream side due to the medium transporting section 37.

As shown in FIG. 5 and FIG. 6, the recording section 38, which is provided on the downstream side of the medium transporting section 37 in the transport direction Y, is provided with the carriage 21, the recording head 23, and a support platform 49 which opposes the recording head 23. The recording head 23, which is provided at a bottom section of the carriage 21 in a state of opposing the paper sheets P, prints an image on the paper sheets P by ejecting ink droplets with regard to the paper sheets P which are supported by the support platform 49 in a process where the carriage 21 is moved back and forth in the main scanning direction X (a direction which is orthogonal to the paper surface in FIG. 5 and FIG. 6) while being guided by the guide shaft 22 due to motive power from a carriage motor 50 (refer to FIG. 9).

The feeding section 39 which is provided on the downstream side of the support platform 49 is provided with a first roller 51 which is driven using the transport motor 43 and the second roller 52 which is rotated by being driven due to coming in contact with the first roller 51. The paper sheets P after printing, which are sent out by the feeding section 39 to the downstream side in the transport direction Y, are stacked on the discharge stacker 24 which slides to an outer side (a front surface side) of the apparatus body 12. Here, in the present embodiment, an example of a transporting section is configured using the medium supplying section 36, the medium transporting section 37, and the feeding section 39

As shown in FIG. 5 and FIG. 6, the discharge stacker 24 (refer to below simply as "stacker 24") is configured by a single tray which substantially is a plate shape with four corners. The stacker 24 is able to move back and forth between a housing position of being housed in the apparatus body 12 and a jutting position of jutting from the apparatus body 12 with a designated jutting length (for example, the state in FIG. 5 and FIG. 6) using an electrical power system which drives using motive power from an electric motor which is not shown in the diagrams.

In the present embodiment, in a case where the movable tray 17, which is originally supposed to be arranged at the setting position, is positioned on the supply position side of the setting position for any reason such as being mistakenly pushed in by a user, controlling to return the movable tray 17 to the setting position is performed and the movable tray 17 is returned to the setting position shown in FIG. 2 and FIG. 5.

Figure 7:
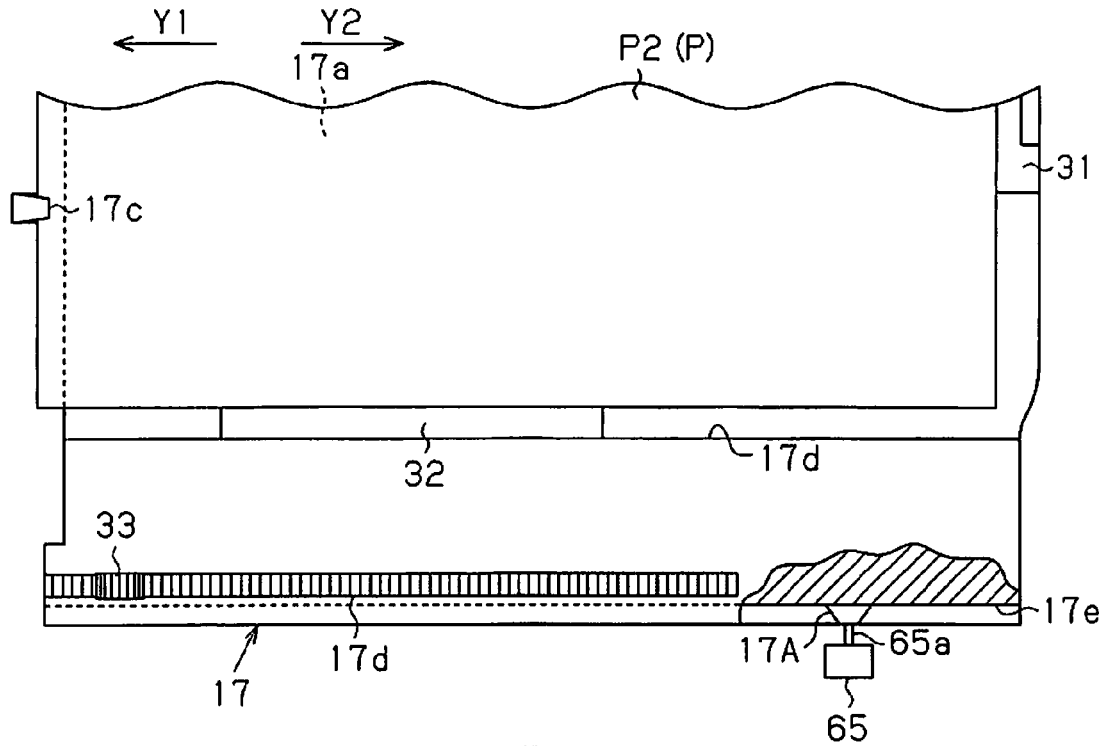
FIG. 7 is a partial planar diagram where a portion is cut away to illustrate a configuration for detecting the position of a movable tray.

A configuration for performing detecting of the position of the movable tray 17 will be described next with reference to FIG. 7. As shown in FIG. 7, a single groove section 17e (a slit), which extends along the movement direction of the movable tray 17, is formed in a side section of the movable tray 17 and a section to be identified 17A is formed with a bulging shape in the groove section 17e at a designated position close to the edge guide 31 in the longitudinal direction. Then, as shown in FIG. 7, the first sensor 65 is positioned to oppose the section to be identified 17A which is formed in the side section of the movable tray 17 which is at the setting position. The first sensor 65 is a contact sensor and is provided with an identifying rod 65a with a lever system or an extending and contracting system. The first sensor 65a is off when the identifying rod 65a is positioned in the groove section 17e and is on when the identifying rod 65a is on top of the section to be identified 17A. As such, when the first sensor 65 is on, it is possible to detect that the movable tray 17 is in the setting position.

Figure 8:
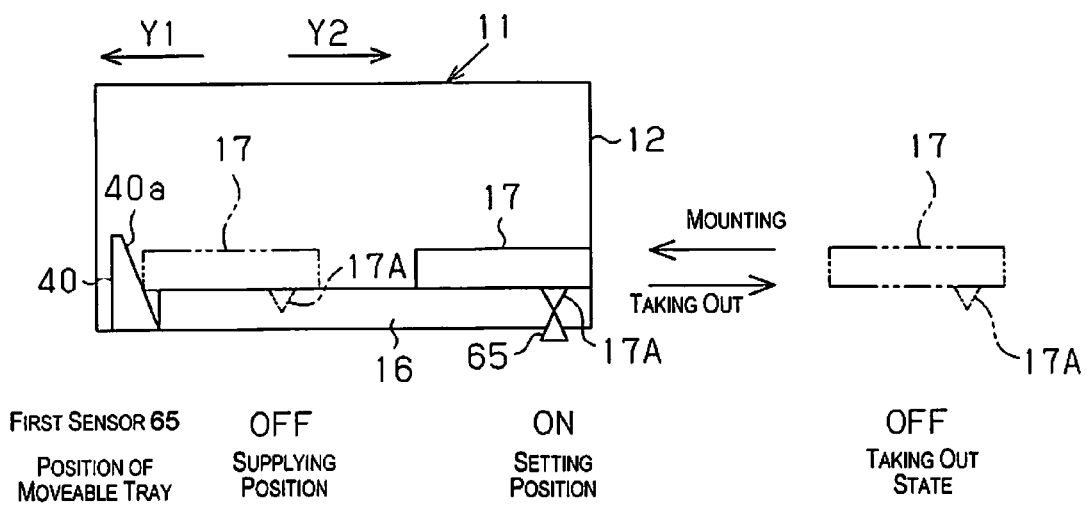
FIG. 8 is a schematic diagram for describing detecting the position of a movable tray.

Then, as shown in FIG. 8, the first sensor 65 is on when the movable tray 17 is at the setting position. That is, the first sensor 65 is off when the movable tray 17 is at any position other than the setting position. For this reason, the first sensor 65 is off when the movable tray 17 is at the supplying position and in a state of being taken out. Since it is possible for the user to see that the movable tray 17 has moved when the first sensor 65 switches from being on to being off when the motor 43 is stopped, it is possible to ascertain that the movable tray 17 has been taken out.

Then, the state where the tray is taken out is stored in a memory and it is possible to determine that the movable tray 17 is mounted when the first sensor 65 switches from being off to being on in a state where the state where the tray is taken out is stored when the motor 43 is not being driven.

The electrical configuration of the printer 11 will be described next.

Figure 9:
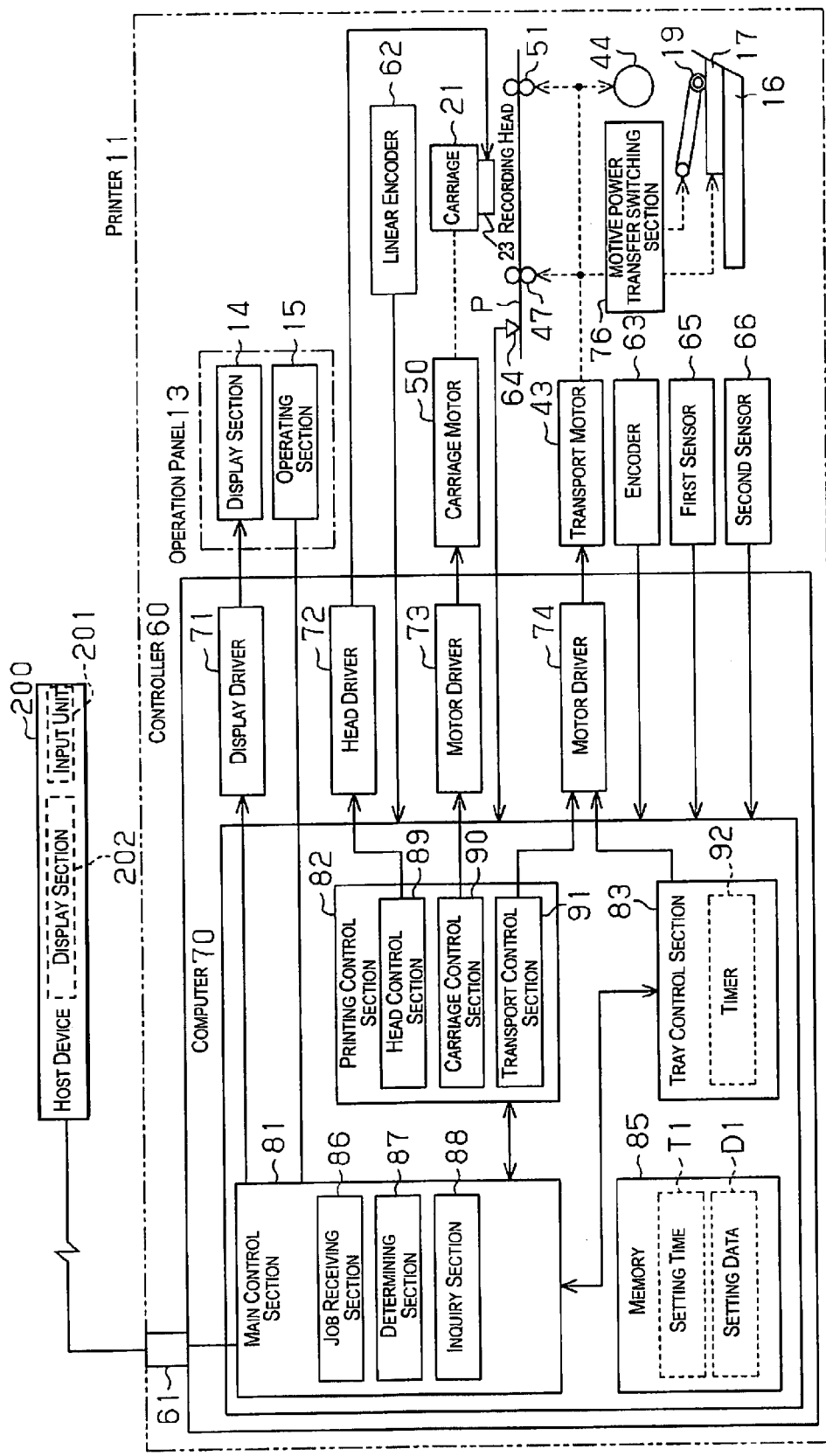
FIG. 9 is a block diagram illustrating an electrical configuration of a printing apparatus and a functional configuration of a computer.

As shown in FIG. 9, the printer 11 is provided with the controller 60 as an example of a control section which carries out various types of controlling. The controller 60 is connected to a host apparatus 200 via a communication interface 61 so as to be able to communicate. The controller 60 controls the operation of printing using the printer 11 and the like based on printing job data which is received from the host apparatus 200. The host apparatus 200 is formed from, for example, a mobile terminal such as a smart phone, a mobile phone, a tablet PC, and a mobile information terminal (a personal digital assistant (PDA)) or a personal computer and printing conditions information is input into a setting screen which is displayed in a display section 202 by a user operating an input section 201. The paper sheet type, the paper sheet size, the printing quality and printing color, and the like are included in the printing conditions information. The host apparatus 200 transmits the printing job data which is generated according to the printing conditions information to the printer 11. In the present example, information, which is necessary for specifying the source for supplying the paper sheets out of the trays 16 and 17 (the paper sheet type and the paper sheet size which are examples) and the like, is included in the printing conditions information as a header for the printing job data.

The display section 14, the carriage motor 50, and the transport motor 43 are connected to the controller 60 as an output system. In addition, the operating section 15 which includes the power source switch 15a, a linear encoder 62, an encoder 63 (for example, a rotary encoder), a paper detecting sensor 64, the first sensor 65 which is an example of a first sensor, and the second sensor 66 which is an example of a second sensor are connected with the controller 60 as an input system.

As shown in FIG. 9, the controller 60 is provided with a computer 70, a display driver 71, a head driver 72, and motor drivers 73 and 74. The computer 70 drives recording head 23 through the head driver 72 based on the printing job data (referred to below simply as "printing job") and an image or the like which is based on the printing job data is drawn on the paper sheets P by ejecting ink droplets. In addition, the computer 70 controls and drives the carriage motor 50 through the motor driver 73 and controls moving of the carriage 21 in the main scanning direction X. At this time, the computer 70 ascertains the movement position of the carriage 21 with, for example, the home position as the origin by counting input pulses from the linear encoder 62 using a counter (which is not shown in the diagrams). Here, in the present embodiment, an example of a recording job is configured using the printing job.

Furthermore, the computer 70 drives and controls the transport motor 43 through the motor driver 74. Here, a motive power transfer switching section 76 (a clutch) is in a motive power transfer path where motive power is transferred from the transport motor 43. The motive power transfer switching section 76 has a switching lever (which is not shown in the diagrams) which is arranged on the movement path of the carriage 21 and, due to the switching lever being moved to a designated position by the carriage 21, switches the switching position according to the designated position. The transport motor 43 is normally connected with the supplying drive roller 44, the transporting drive roller 47, and the first roller 51. The destination of motive power transfer from the transport motor 43 is switched to one of a plurality of targets for driving which include the movable tray 17 and the pickup roller 19 by selecting the switching position of the motive power transfer switching section 76.

In a state where the motive power transfer switching section 76 shown in FIG. 9 is at a tray switching position, the pinion gear wheel 33 (refer to FIG. 2) is forward rotated when the transport motor 43 is driven with forward rotation and the movable tray 17 is moved in a direction from the setting position in the apparatus body 12 toward the supplying position through meshing of the rack section 17d and the pinion gear wheel 33 which is being forward rotated. On the other hand, the pinion gear wheel 33 is reverse rotated when the transport motor 43 is driven with reverse rotation and the movable tray 17 is moved in a direction from the supplying position in the apparatus body 12 toward the setting position through meshing of the rack section 17d and the pinion gear wheel 33 which is being reverse rotated.

The encoder 63 outputs a detection pulse sensor, which has a number of pulses which are proportional to the amount of rotation of the transport motor 43, to the computer 70. In addition, the first sensor 65 is off in a state where the movable tray 17 is at the setting position (FIG. 5) and is off in a state where the movable tray 17 is not at the setting position. In addition, the computer 70 identifies that the movable tray 17 is at the supplying position (FIG. 6) due to an impact when the movable tray 17 hits the regulating section which is at an edge position due to being moved to the supplying position side.

At this time, it is possible for the computer 70 to detect the load on the motor 43 (for example, an electric current value) and driving of the motor 43 is stopped when the load on the motor (for example, the motor electric current) exceeds a threshold during driving of the motor 43 by a designated amount of rotating. Due to this, the movable motor 17 is arranged at the supplying position. In addition, the computer 70 ascertains that the movable tray 17 is at the supplying position. Here, in the present embodiment, an example of the driving section is configured in order to drive the movable tray 17 using the transport motor 43 and the motor driver 74.

The computer 70 shown in FIG. 9 is configured using, for example, a CPU, an application specific IC (ASIC), a RAM, a ROM, a nonvolatile memory, and the like. Various types of programs, which include programs for controlling the trays which are shown in the flowcharts in FIGS. 11A and 11B and FIGS. 12A and 12B, are stored in the ROM or the nonvolatile memory. FIGS. 11A and 11B is a tray control routine when the movable tray 17 is moved using motive power from the motor 43 and FIGS. 12A and 12B is a tray detection routine which is executed when the movable tray 17 is not being driven and is where taking out and inserting (mounting) of the movable tray 17 by the user is detected.

The computer 70 is provided with a plurality of functional sections shown in FIG. 9 which are formed from software which is constructed so that the CPU executes the programs which are stored in the ROM or the nonvolatile memory. That is, the computer 70 is provided with a main control section 81, a printing control section 82, and a tray control section 83. In addition, the computer 70 is provided with a memory 85 which stores various types of data which is necessary for various types of controlling. It is obvious that each of the functional sections are not limited to the configuration of software which is used in the computer 70 and there may be a hardware configuration such as an electronic circuit (for example, a custom IC) or a configuration where software and hardware work together.

As shown in FIG. 9, the main control section 81 is provided with a job receiving section 86, a determining section 87, and an inquiry section 88. The job receiving section 86 receives the printing job data from the host apparatus 200 and receives the printing job data in order to printing image data which is input into the printer 11 from a portable memory apparatus such as a memory card or a USB memory which is connected to the printer 11. Information on the paper sheet size is included in the printing job data.

In addition, the determining section 87 performs various types of determination processing which is necessary in terms of controlling the printer 11.

Determination processing, which is necessary in terms of performing control of the trays where movement of the movable tray 17 is controlled, is included in the determination processing.

The inquiry section 88 performs an inquiry about the type of paper sheet which is set by a user by displaying an inquiry screen 103A shown in FIG. 10B on the display section 14 when it is detected that one out of the lower level tray 16 and the movable tray 17 is mounted (inserted) into the apparatus body 12.

Furthermore, settings data D1 (refer to FIG. 9), which represents the corresponding relationship between each of the supply trays 16 and 17 and the types of paper sheets which are accommodated in the supply trays 16 and 17, is stored by the computer 70 in the memory 85 as data which is referenced when, for example, selecting the type of paper sheet or the supply tray which accommodates the type of paper sheet which is specified according to the printing mode. Here, the "type of paper sheet" in the present example indicates the "paper sheet size" and "quality type (paper sheet type)".

For this reason, it is possible for the controller 60 to detect mounting of the supply trays 16 and 17 into the apparatus body 12 based on the detection signals from the sensors 65 and 66. At this time, there is a possibility that the type of paper sheet is modified due to the paper sheets P which are set in the supply trays 16 and 17 being replaced.

The main control section 81 shown in FIG. 9 is activated when there is a tray setting operation using, for example, the operating section 15 and a setting screen 100 which is shown in FIG. 10A is displayed on the display section 14. Tray selection buttons 101A and 101B, where the paper sheet size and the quality type of the paper sheets P which are set in the separate supply trays are displayed in a button display region, are provided in the setting screen 100 which is shown in FIG. 10A and it is possible to scroll the screen in the direction of the arrow which is operated when an arrow key 102 is operated and to select the tray selection buttons.

When there is an operation, for example, to select the tray selection button 101A of a first tray in the setting screen 100, there is a switch to the separate tray setting screen 103 which is shown in FIG. 10B. A paper sheet size button 104, which is operated when setting the paper sheet size of the paper sheet P which is set in the supply tray which is selected, and a quality type button 105 which is operated when setting the quality type are provided in the separate tray setting screen 103.

When there is an operation, for example, to select the paper sheet size button 104, there is switching to a paper sheet size selection screen 106 which is shown in FIG. 10C. In the example of paper sheet size selection screen 106, a list of candidates such as large photo size, postcard size, A5, and B6 are displayed as targets for selecting the paper sheet size using buttons 107. When the arrow key 102 in the paper sheet size selection screen 106 is selected by operating the operating section 15, it is possible to scroll the screen in the direction of the arrow which is operated and to select one out of all of the paper sheet size buttons 107. As shown in the example of FIG. 10C, "postcard size" is set by switching from "small photo size" when the button 107 for "postcard size" which is shown with a bold outline in the diagram is selected as the paper sheet size.

On the other hand, when there is an operation to select the quality type button 105 in the separate tray setting screen 103 which is shown in FIG. 10B, there is switching to a quality type selection screen 108 which is shown in FIG. 10D. In the example of the quality type selection screen 108, a list of candidates for quality type where the corresponding printing is possible such as normal paper, recycled paper, color paper, photo paper are displayed using buttons 109. When the arrow key 102 in the screen 108 is selected, it is possible to scroll the screen in the direction of the arrow which is operated and to select one out of all of the quality type buttons 109. As shown in the example of FIG. 10D, "normal paper" is set by switching from "photo paper" when the button 109 for "normal paper" which is shown with a bold outline in the diagram is selected as the quality type. The setting data D1 is updated in this manner.

Here, when a user replaces the paper sheets by taking out either of the supply trays 16 and 17, the corresponding relationship of the supply trays 16 and 17 and the type of paper sheet is different to the setting data D1 in practice. In this case, there is a concern that there is printing on the paper sheet which is different to the type of paper sheet which is specified when printing. Therefore, when mounting of the supply tray is identified, the main control section 81 of the present embodiment displays the inquiry screen 103A, which prompts inputting by a user with regard to an inquiry about the type of paper sheet in the supply tray, on the display section 14. The inquiry screen 103A displays a message which prompts inputting such as, for example, "please input the type of paper sheet which is set in the supply tray" using a screen in the same manner as the separate tray setting screen 103 which is shown in FIG. 10B.

In a case where at least one out of the paper sheet size and the quality type is modified in the inquiry screen 103A by operating the operating section 15, the main control section 81 updates the portion of data which corresponds to the relevant supply tray in the setting data D1 to the modified content. The setting data D1, which expresses the corresponding relationship between the supply trays 16 and 17 and the type of paper sheet, is stored in the memory 85 in this manner. Here, by a cancel button which is not shown in the diagrams being operated if there is no modifying of the paper sheet size or the quality type, the display section 14 is switched to a main menu screen along with the settings up until now being maintained.

In addition, the printing control section 82 shown in FIG. 9 is provided with a head control section 89, a carriage control section 90, and a transport control section 91. The head control section 89 controls the recording head 23 through the head driver 72 based on image data in the printing job data which is received from the main control section 81 and performs controlling where ink droplets are ejected from the recording head 23.

The carriage control section 90 drives and controls the carriage motor 50 through the motor driver 73 and controls movement of the carriage 21 in the main scanning direction X. In addition, the carriage control section 90 drives the carriage motor 50 for an operation of switching the motive power transfer switching section 76 using the carriage 21. The carriage control section 90 ascertains the position of the carriage 21 in the main scanning direction X where, for example, the home position is the origin, from the numerical values where input pulses from the linear encoder 62 are counted using the counter (which is not shown in the diagrams).

The transport control section 91 drives and controls the transport motor 43 through the motor driver 74 and the controls supplying and transporting of the paper sheets P. Motive power from the transport motor 43 is transferred to the supplying drive roller 44, the transporting drive roller 47, and the first roller 51 through the motive power transfer path which includes a gear train and the paper sheets P are supplied and transported by each of the rollers 44, 47, and 51 being rotated using the motive power which is transferred. When the transport motor 43 is driven in a state where, for example, the motive power transfer switching section 76 is switched to the tray switching position, the rotation which is output is transferred to the pinion gear wheel 33 and the movable tray 17 is driven using the motive power which is transferred through meshing of the pinion gear wheel 33 and the rack section 17d. In addition, when the transport motor 43 is driven in a state where, for example, the motive power transfer switching section 76 is switched to the supply switching position, supplying of paper sheets is performed due to the pickup roller 19 being rotated.

The tray control section 83 shown in FIG. 9 moves the movable tray 17 due to the transport motor 43 being driven and control through the motor driver 74 in a state where the motive power transfer switching section 76 is at the tray switching position. The tray control section 83 controls the movement speed of the movable tray 17 by occasionally outputting an electric current command value according to differences in the current speed and the target speed to the motor driver 74. At this time, the position of the movable tray 17 is obtained using the numerical value where the pulse edges of the detection signals from the encoder 63 are counted. Here, since it is possible for the user to move the movable tray 17 when connection between the motive power transfer switching section 76 and the movable tray 17 is interrupted, the numerical value does not always represent the actual position of the movable tray 17. As such, it is not possible to ascertain the position from the numerical value when the movable tray 17 stops (when motive power transfer is interrupted) and ascertaining of the position depends on the signal from the first sensor 65.

The tray control section 83 moves the movable tray 17 from the setting position toward the supplying position due to the transport motor 43 being forward rotated in a state where the movable tray 17 is at the setting position (in a state where the first sensor 65 is on). At this time, when the movable tray 17 is separated from the setting position, the first sensor 65 switches from on to off. When the movable tray 17 further approaches the supplying position and hits the separating mechanism 40 (which is an example of a regulating section), the load on the motor 43 increases and there is a command for an electric current value which is relatively large according to this load in an attempt to get the speed which has fallen to the target using a large load. When the motor electric current value exceeds the threshold, the tray control section 83 stops driving of the transport motor 43. Due to this, the movable tray 17 stops at the supplying position.

In addition, the tray control section 83 drives the movable tray 17 from the supplying position toward the setting position due to the transport motor 43 being reverse rotated in a state where the movable tray 17 is at the supplying position. At this time, when the movable tray 17 arrives at the supplying position, the first sensor 65 switches from off to on. When the first sensor 65 switches from off to on, the movable tray 17 stops at the setting position due to the tray control section 83 stopping driving of the transport motor 43.

In addition, the tray control section 83 is provided with a timer 92. The timer 92 performs measuring of the elapsing of time from the point in time when the printing job is complete reaches a standby time which is set in advance. The timer 92 is configured using, for example, a counter. The tray control section 83 starts measuring of the standby time using the timer 92 when notification that printing based on the printing job is complete is received from the printing control section 82. Then, when time is up on the timer 92, the tray control section 83 performs control where the movable tray 17 is moved from the supplying position to the setting position. In this manner, since the movable tray 17 is relatively quickly arranged at the setting position after printing is complete, it is possible for the user to quickly perform necessary replacing of paper sheets or replenishing of paper sheets. In addition, since there is waiting over the standby time, in a case where the next printing job data is sent without any time in between in cases where, for example, printing job data is sent continuously, it is possible to relatively quickly start the next printing where the paper sheets P2 are supplied from the movable tray 17 since the movable tray 17 is at the supplying position.

Here, selecting of either of the lower level tray 16 or the movable tray 17 to use in supplying is performed by a user operating the input section 201 in a state where the setting screen is displayed on the display section 202 of the host apparatus 200 or operating the operating section 15 in a state where the setting screen is displayed on the display section 14 of the printer 11. These operations may be configured by specifying and selecting one out of the plurality of trays 16 and 17 on the setting screen or may be configured by, when specifying information which includes the paper sheet size and the like is specified, the host apparatus 200 selects one out of the trays 16 and 17 based on the specification information.

Actions of the printer 11 will be described next. When the printer 11 is in a state where the power source is on, the computer 70 executes a tray control routine shown in FIGS. 11A and 11B or a tray position detecting routine shown in FIGS. 12A and 12B every designated period of time (a designated value in the range of, for example, 10 μsec to 100 msec).

The computer 70 executes the tray control routine shown in FIG. 11A when the movable tray 17 moves from the setting position to the supplying position. Here, the printer 11 stores the current position of the movable tray 17 in the memory 85 as a value for a flag. For example, the current position is stored in the memory 85 with a flag F as 01 when at the setting position, the flag F as 10 when at the supplying position, and the flag F as 11 when in the taking out state. Since the movable tray 17 basically returns to the setting position, it is often the case that the movable tray 17 is at the setting position. The computer 70 executes a program shown in FIG. 11A if the current position of the movable tray 17 is the setting position in a case where the movable tray 17 is selected as the tray which is to be used as the origin for supply paper sheets by interpreting the printing job data. Here, in the following description, the movable tray 17 is selected as the destination of motive power transfer from the motive power transfer switching section 76 before driving of the motor 43.

First, in step S11, the motor 43 is driven in a direction where the movable tray 17 heads to the supplying position. The computer 70 moves the movable tray 17 from the setting position to the supplying position by, for example, the motor 43 being forward driven.

Next, in step S12, it is determined whether or not impact is detected. The computer 70 detects the load on the motor 43 (for example, the electric current value) and detects impact where the movable tray 17 hits the separating mechanism 40 when the load on the motor increases and exceeds the threshold during driving of the motor 43 by a designated amount of driving which is necessary for moving the movable tray 17 from the setting position to the supplying position. If impact is not detected, driving of the motor 43 is continued. On the other hand, when impact is detected due to the load on the motor 43 exceeding the threshold with the movable tray 17 hitting the separating mechanism 40 (an affirmative determination in step S12), the computer 70 transitions to step S13 which is next.

In step S13, driving of the motor 43 is stopped. As a result, the movable tray 17 stops at the supplying position. Then, when the movable tray 17 stops at the supplying position, the computer 70 starts printing based on the printing job data. There is a state where the swinging member 20 is pushed upward in a process where the movable tray 17 is moved from the setting position to the supplying position and the pickup roller 19 abuts with the surface of the uppermost paper sheet P2 when the movable tray 17 reaches the supplying position. Then, the paper sheet P2 is supplied from the movable tray 17 by the transport motor 43 being driven in a state where the pickup roller 19 is selected as the destination of motive power transfer from the motive power transfer switching section 76 and printing is carried out on the paper sheet P2 which is supplied using the recording section 38 and the like.

When printing is complete and a designated standby time elapses, the computer 70 moves the movable tray 17 from the supplying position to the setting position. At this time, the computer 70 executes a program shown in the flow chart in FIG. 11B. Here, the first sensor 65 is in an off state when the movable tray 17 in at the supplying position.

First, in step 21, the motor 43 is driven in a direction where the movable tray 17 heads to the setting position. The computer 70 moves the movable tray 17 from the supplying position to the setting position by, for example, the motor 43 being reverse driven.

Next, in step S22, it is determined whether or not the first sensor 65 is identifying. The computer 70 determines whether or not the first sensor 65 switches from off to on. If the first sensor 65 is off without any change, driving of the motor 43 is continued. Then, when the first sensor 65 switches from off to on (an affirmative determination in step S22), the computer 70 transitions to step S23 which is next.

In step S23, driving of the motor 43 is stopped. As a result, the movable tray 17 stops at the setting position. Since the movable tray 17 is quickly returned to the setting position after printing is complete, it is possible for a user to quickly perform necessary replacing of paper sheets or replenishing of paper sheets after printing is complete. In addition, there is waiting for elapsing of the standby time after printing is complete until the movable tray 17 starts an operation of returning to the setting position. For this reason, it is possible to relatively quickly start the next printing which performed by the paper sheets P2 being supplied from the movable tray 17 since the movable tray 17 is at the supplying position even when the next printing job data is sent without any time in between in cases where, for example, printing job data is sent continuously.

During driving of the movable tray 17 using the motor 43 in this manner, a user basically does not move the movable tray 17 by touching the movable tray 17. On the other hand, it is possible for a user to take out and mount the movable tray 17 with a relatively light force since connection on the motive power transfer path between the motor 43 and the pinion gear wheel 33 is interrupted when the movable tray 17 is stopped and the movable tray 17 is not selected as the destination for motive power transfer from the motor 43. The computer 70 executes a program shown in the flow charts in FIGS. 12A and 12B in order to detect taking out and mounting of the movable tray 17 when the motor 43 is not driving the movable tray 17, that is, when the movable tray 17 is stopped. Here, when the motor 43 is not driving the movable tray 17 indicates times other than when the motor 43 is being driven in a state where the movable tray 17 is selected as the destination for motive power transfer from the motor 43.

First, when the current position of the movable tray 17 is at the setting position (the flag F is 01), the computer 70 executes a program shown in the flow chart in FIG. 12A. At this time, the first sensor 65 is in an identifying state (an on state) due to the section to be identified 17A being identified.

First, in step S31, it is determined whether or not the first sensor 65 is non-identifying. The computer 70 determines whether or not the first sensor 65 switches from on to off.

If the first sensor 65 is on without any change, this determination processing is repeated over a designated cycle time. Then, for example, when a user takes out the movable tray 17 from the setting position, the first sensor 65 switches from on to off. As a case where a user moves the movable tray 17, there are the examples of a case where the movable tray 17 is taken out in order to replace paper sheets or replenish paper sheets, a case where the movable tray 17 is touched and mistakenly pushed to the far side (a direction to the supplying position side) when, for example, housing the discharge stacker 24, and the like. When a user moves the movable tray 17 in this manner and the first sensor 65 switches from on to off (an affirmative determination in step S31), the computer 70 transitions to step S32 which is next.

In step S32, the motor is driven in a direction where the movable tray 17 heads to the setting position with a designated amount of driving. At this time, since the pinion gear wheel 33 and the rack section 17d are not meshing, the motor 43 and the pinion gear wheel 33 freely rotate in a case where a user is taking out the movable tray 17. On the other hand, when a user mistakenly pushes in the movable tray 17, the movable tray 17 moves in a direction from the position, where the movable tray 17 is pushed, to the setting position since the pinion gear wheel 33 and the rack section 17*d* are meshing. The designated amount of driving of the motor 43 which is driven at this time is set to an amount of driving which is sufficient to move the movable tray 17 from this position to the setting position even if the movable tray 17 happens to be pushed to the deepest position (for example, to the supplying position). Here, since the amount by which a user could mistakenly push the movable tray 17 is relatively small, the designated amount of driving may be set to an amount of driving to the extent where a slight margin is added to an estimated amount of pushing. For example, the designated amount of pushing may be an amount of motor driving so that it is possible for the movable tray 17 to move a distance within a range of a quarter to a half of the movement distance between the supplying position and the setting position of the movable tray 17.

In step S33 which is next, it is determined whether or not the first sensor 65 is identifying. The computer 70 determines whether or not the first sensor 65 switches from off to on. If the first sensor 65 is off without any change, determination processing is repeated over a designated cycle time until the motor 43 stops due to being driven by the designated amount of driving. For example, in a case where a user mistakenly pushed in the movable tray 17, the movable tray 17 reaches the setting position and the first sensor 65 switches from off to on at this time. In a case where the first sensor 65 switches from off to on in this manner (an affirmative determination in step S33), there is a transition to step S34. On the other hand, in a case where the motor 43 completes driving by the designated amount of driving without the first sensor 65 switching from off to on (a negative determination in step S33), there is a transition to step S35.

In step S34, driving of the motor 43 is stopped and that the movable tray 17 is at the setting position is stored in the memory 85. For example, in a case where a user mistakenly pushes in the movable tray 17, the movable tray 17 stops when reaching the setting position. Then, the computer 70 updates the flag F in the memory 85 to a value of "01" of the setting position.

In step S35, driving of the motor 43 is stopped and that the movable tray 17 is in the tray taking out state is stored in the memory 85. The computer 70 updates the flag F from, for example, a value of "01" of the setting position to a value of "11" of the taking out state. In this manner, it is possible for the computer 70 to recognize the tray taking out state when a user takes out the movable tray 17. At this time, when the movable tray 17 mistakenly pushed in when, for example, a user houses the discharge stacker 24 and the first sensor 65 switches from on to off (an affirmative determination in step S31), this is distinguished and it is possible for taking out of the movable tray 17 to be correctly detected. Here, there may be a configuration where that the movable tray 17 is in the tray taking out state is stored when the first sensor 65 switches from on to off in step S31 without the processing of steps S32 to S34.

When taking out of the movable tray 17 is detected, the computer 70 displays guidance, such as precautions and operating instructions when setting the paper sheets P2 with regard to the movable tray 17, on the display section 14. As the types of guidance, there are the examples of orientation in which the paper sheets are set with regard to the movable tray 17, guidance which requests an operation so that the edge guides 31 and 32 (which are an example of a medium guide) are in positions to match the paper sheet size, and the like. In addition, after this, in a case where a printing job is received with the movable tray 17 as the origin for supplying paper sheets, the computer 70 displays a message which prompts mounting of the movable tray 17 on the display section 14 when the movable tray 17 is in the taking out state. For this reason, it is possible to perform desired printing by a user who has seen this message mounting the movable tray 17.

In addition, the computer 70 executes a program shown in the flow chart in FIG. 12B in a case where the movable tray 17 is in the taking out state in order to replace paper sheets or the like. At this time, the first sensor 65 is in a non-identifying state (an off state).

First, in step S41, it is determined whether or not the first sensor 65 is identifying. The computer 70 determines whether or not the first sensor 65 switches from off to on. If the first sensor 65 is off without any change, the determination processing is repeated every designated cycle time. Then, for example, when a user mounts the movable tray 17 at the setting position, the first sensor 65 switches from off to on. As a case where a user mounts the movable tray 17, there is an example of a case where the movable tray 17 is mounted again in the apparatus body 12 due to replacing of paper sheets or replenishing of paper sheets being completed. When the first sensor 65 switches from on to off (an affirmative determination in step S41) due to mounting of the movable tray 17 by a user, the computer 70 transitions to the processing of step S42 which is next.

In step S42, that the movable tray 17 is at the setting position is stored in the memory 85. The computer 70 updates the flag F from, for example, a value of "11" of the taking out state to a value of "01" of the setting position. In this manner, it is possible for the computer 70 to detect mounting of the movable tray 17 and to recognize that the movable tray 17 is in the mounting state based on the flag F which is updated.

The computer 70 displays the inquiry screen 103A shown in FIG. 10B on the display section 14 when mounting of the movable tray 17 is detected and prompts a user to input the type of paper sheet which is set in the movable tray 17. The inquiry section 88 performs this display processing.

For example, a user selects the paper sheet size button 104 by operating the operating section 15 using the inquiry screen 103A shown in FIG. 10B and, for example, "postcard size" is selected by operating the operating section 15 using the paper sheet size selection screen 106 (refer to FIG. 10C) which the screen is switched to. In addition, a user selects the quality type button 105 by operating the operating section 15 and, for example, "normal paper" is selected by operating the operating section 15 using the quality type selection screen 108 (refer to FIG. 10D) which the screen is switched to.

In a case where at least one of the paper sheet size and the quality type is modified by operating using the inquiry screen 103A, the main control section 81 updates the portion of data which corresponds to the relevant supply tray in the setting data D1 to the modified content. The setting data D1, which expresses the updated corresponding relationship between the supply trays 16 and 17 and the type of paper sheet, is stored in the memory 85 in this manner.

For example, after this, in a case where a printing job is received with the movable tray 17 as the origin for supply paper sheets, the printing control section 82 determines the type of paper sheet (the paper sheet information) according to the printing mode which is specified or obtains the type of paper sheet which is specified. Then, the printing control section 82 selects one which is to be the origin for supply paper sheets out of each of the supply trays 16 and 17 by referencing the setting data D1 on the basis of the type of paper sheet. In a case where, for example, the paper sheet size is "postcard size" and the quality type is "normal paper", the movable tray 17 is selected as the origin for supplying paper sheets. The tray control section 83 moves the movable tray 17 from the setting position to the supplying position. Then, the printing control section 82 starts printing based on the printing job data which is specified. In this manner, printing is carried out on, for example, a postcard which is supplied from the movable tray 17.

According to the embodiment described above in detail, it is possible to obtain the effects shown below.

(1) It is possible to identify the section to be identified 17A which is formed on a side section of the movable tray 17 is at the setting position by identifying using one sensor which is the first sensor 65 and it is detected that the movable tray 17 arrives at the supply position when the drive load on the motor 43 (which is an example of a driving section) exceeds a threshold due to the movable tray 17 hitting the separating mechanism 40 (which is an example of a regulating section). As such, it is possible for the number of sensors which are necessary to detect the setting position and the supplying position of the movable tray 17 to be just one sensor which is the first sensor 65. As such, it is possible to detect a plurality of position states of the movable tray 17 which are necessary in controlling the movable tray 17 even with a fewer number of sensors than the number of targets for detection. For example, in the present embodiment, the number of sensors which are necessary for detecting the three position states of the setting position, the supplying position, and the taking out state is just the one sensor for identifying the setting position. Accordingly, it is possible to reduce the number of parts in the printer 11.

(2) The computer 70 detects taking out of the movable tray 17 when the first sensor 65 switches from a non-identifying state (an off state) where the section to be identified 17A is not identified to an identifying state (an on state) where the section to be identified 17A is not identified when the motor 43 is not driving the movable tray 17. Then, mounting of the movable tray 17 is detected when the first sensor 65 switches from the non-identifying state (the off state) to the identifying state (the on state) after this. As such, it is possible to detect both taking out and mounting of the movable tray 17 using the one sensor which is the first sensor 65.

(3) The computer 70 drives the motor 43 so that the movable tray 17 moves to the setting position when the first sensor 65 switches from an identifying state (an on state) where the section to be identified 17A is identified to a non-identifying state (an off state) where the section to be identified 17A is not identified when the motor 43 is not driving the movable tray 17. Taking out of the movable tray 17 is detected when the first sensor 65 is not in the identifying state (the on state) even though the motor 43 is driven with the designated amount of driving. As such, it is possible to more accurately detect taking out of the movable tray 17 using one sensor which is the first sensor 65. The first sensor 65 switches from an on state to an off state even in a case where, for example, the movable tray 17 is pushed in, but the first sensor 65 is in the identifying state (an on state) due to the movable tray 17 arriving at the setting position while the motor 43 is being driven by the designated amount of driving in a case where the motor 43 is driven so that the movable tray 17 moves to the setting position. For this reason, it is possible to correctly detect taking out of the movable tray 17 without mistakes in cases where the movable tray 17 is pushed in.

(4) The printer 11 is provided with the lower level tray (which is an example of a second medium accommodating section) which accommodates the paper sheets separately to the movable tray 17 and the second sensor 66 (which is an example of a second sensor) which is able to identify the protruding section 16d which is at an end section on the downstream side of the lower level tray 16 in the insertion direction Y1. The computer 70 detects mounting of the lower level tray 16 when the second sensor 66 identifies the protruding section 16d of the lower level tray 16 and detects taking out of the lower level tray 16 when the second sensor 66 no longer identifies the protruding section 16d. As such, it is possible for the computer 70 to detect both mounting and taking out of the lower level tray 16.

(5) There is provided the display section 14 which displays the inquiry section 103A which prompts inputting of paper sheet information (medium information) which includes the type (quality type and size) of paper sheet (which is an example of a medium), the operating section 15 which is operated in order to input the paper sheet information, and the memory 85 (which is an example of a memory section) which stores the paper sheet information so as to be associated with one out of the supply trays 16 and 17 in which the paper sheets are mounted. The computer 70 displays the inquiry screen 103A if it is detected that either of the supply trays 16 and 17 are mounted and stores the paper sheet information which is input by a user operating the operating section 15, in the memory 85 to be associated with the supply tray where mounting is detected. As such, it is possible to avoid printing on the wrong paper sheets since the computer 70 updates the setting data D1, which is referenced when selecting the supply tray which is to be the origin for supplying paper sheets, to the most up-to-date state.

(6) The computer 70 displays guidance (guidance for displaying directions for setting paper sheets, setting of the edge guides, and the like), other than the content which prompts inputting of the paper sheet information, on the display section 14 when it is detected that either of the supply trays 16 and 17 are taking out. As such, it is possible for a user to correctly accommodate the paper sheets P in the supply trays 16 and 17 which are taken out in accordance with the guidance which is displayed.

Second Embodiment

A second embodiment will be described next with reference to the diagrams. It is not possible for movement direction to be detected when the movable tray 17 is being inserted and extracted in the first embodiment, but it is possible for movement direction to also be detected when the movable tray 17 is being inserted and extracted in the second embodiment. Here, the configuration for detecting the position of the movable tray 17 and the content for controlling which is performed in order to detect the position of the movable tray 17 are different to the first embodiment but, since the other configurations are the same as the first embodiment, the configurations which are shared with the first embodiment are given the same reference numerals and the description thereof is omitted.

Figure 13:
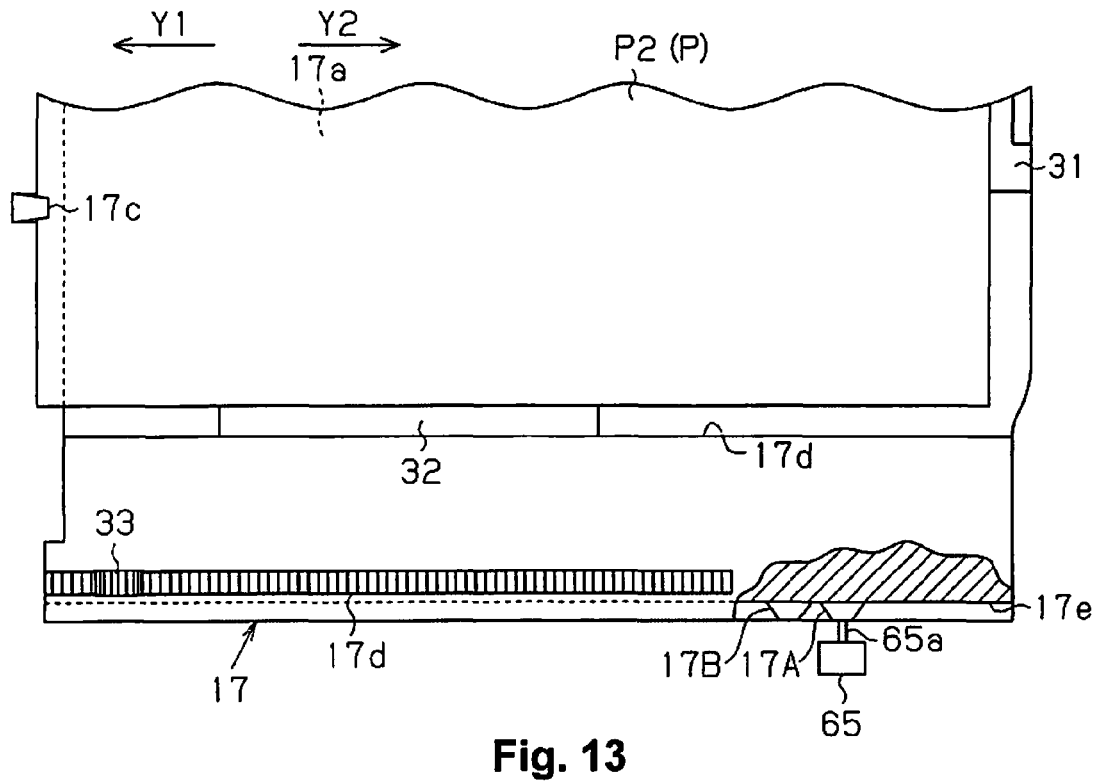
FIG. 13 is a partial planar diagram where a portion is cut away to illustrate a configuration for detecting the position of a movable tray in a second embodiment.

As shown in FIG. 13, in addition to the section to be identified 17A, a section to be identified 17B with a platform shape in a planar view is formed at the side section of the movable tray 17 in the same manner as the section to be identified 17A at a position which is substantially adjacent to the section to be identified 17A on the insertion direction Y1 side. Here, for ease of description, the section to be identified 17A, where a state where the movable tray 17 is at the setting position is identified by the first sensor 65, is referred to below as a "first section to be identified 17A". In addition, the section to be identified 17B, which is provided at a position which is able to be identified by the first sensor 65 after the first sensor 65 no longer identifies the first section to be identified 17A due to the movable tray 17 moving from the setting position in the taking out direction Y2, is referred to below as a "second section to be identified 17B".

One or more of the second sections to be identified 17B is provided where the number of the second sections to be identified 17B, which are provided in the movable tray 17 at positions on the insertion direction Y1 side of the first section to be identified 17A, is greater than the number of the second sections to be identified 17B, which are provided in the movable tray 17 at positions on the taking out direction Y2 side of the first section to be identified 17A. In particular, in the present example, the number of the second sections to be identified 17B, which are provided in the movable tray 17 at positions on the insertion direction Y1 side of the first section to be identified 17A, is one, the number of the second sections to be identified 17B, which are provided in the movable tray 17 at positions on the taking out direction Y2 side of the first section to be identified 17A, is zero, and a total of one of the second sections to be identified 17B is provided.

The computer 70 detects taking out of the movable tray 17 when the first sensor 65 switches from on (an identifying state) to off (a non-identifying state) when the motor 43 is not driving the movable tray 17 and when the number of the second sections to be identified 17B which are provided on the insertion direction Y1 side is the same as the number of times when the first sensor 65 is on (in an identifying state) (one in the present example). In addition, the computer 70 detects mounting (inserting) of the movable tray 17 when the total number of the number of the second sections 17B to be identified which are provided on the insertion direction Y1 side and the number of the first sections to be identified is the same as the number of times that the first sensor 65 is on (in an identifying state) (two in the present example).

Figure 14:
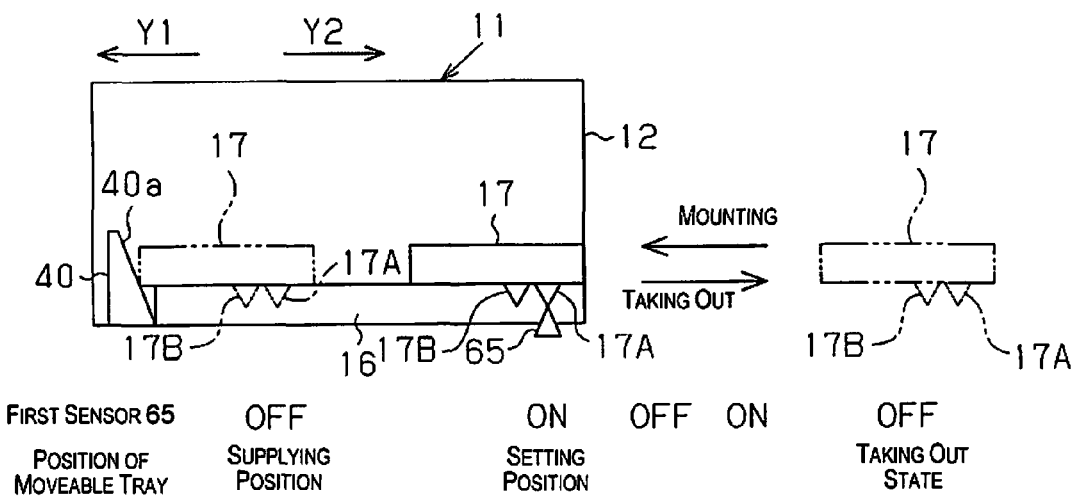
FIG. 14 is a schematic diagram for describing detecting the position of a movable tray.

As shown in FIG. 14, the first sensor 65 is on when the movable tray 17 is at the setting position. In addition, the first sensor 65 is off when the movable tray 17 is at the supplying position. The first sensor 65 changes from an on state where the first section to be identified 17A is identified in order of OFF→ON→OFF since the second section to be identified 17B is in the process of being identified in a case where a user takes out the movable tray 17 when the motor 43 is stopped. On the other hand, the first sensor 65 changes from an off state in order of ON→OFF→ON with the target for identifying switching as the sections to be identified 17B and 17A are identified in this order and the target for detection is switched in a case where the movable tray 17 which is in the taking out state is mounted in the setting position.

Figures 15A, 15B, 15C, 15D:
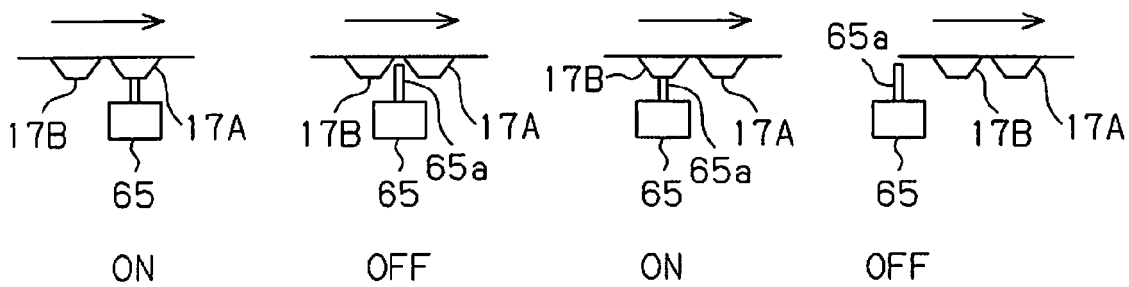
FIGS. 15A to 15D are schematic diagrams illustrating transition of a signal from a first sensor in a process where a movable tray is taken.

That is, the first sensor 65 is in an off state by the identifying rod 65a being removed from the first section to be identified 17A as shown in FIG. 15B in a process where the movable tray 17 moves in the taking out direction shown by the arrow from a state where the first sensor 65 shown in FIG. 15A is on when the first section to be identified 17A is identified. Next, the first sensor 65 is in an on state by the identifying rod 65a being on top of the second section to be identified 17B as shown in FIG. 15C. Then, the first sensor 65 is in an off state by the identifying rod 65a being removed from the second section to be identified 17B as shown in FIG. 15D. In this manner, the first sensor 65 changes from an on state to OFF→ON→OFF in a process where the movable tray 17 is taken out.

On the other hand, the sequence is the opposite for a process for taking out a tray in a process where the movable tray 17 which is in the taking out state is mounted in the setting position. For this reason, the first sensor 65 changes in order from an off state shown in FIG. 15D, an on state shown in FIG. 15C, an off state shown in FIG. 15D, to an on state shown in FIG. 15A.

Figure 16:
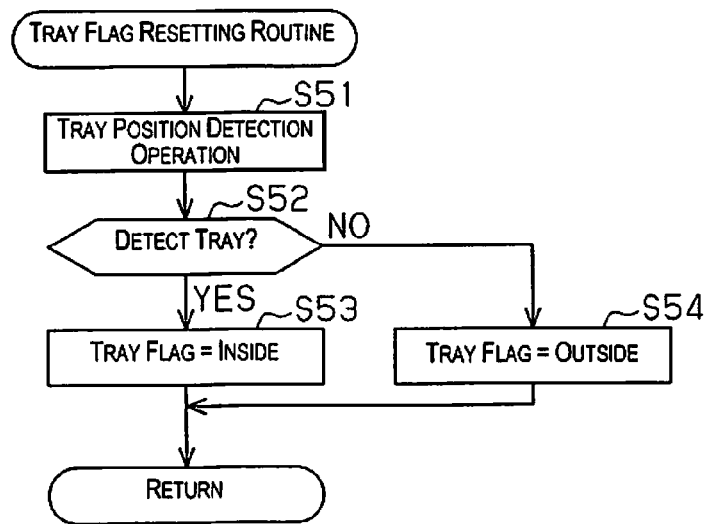
FIG. 16 is a flow chart illustrating a tray flag resetting routine.
Figure 17:
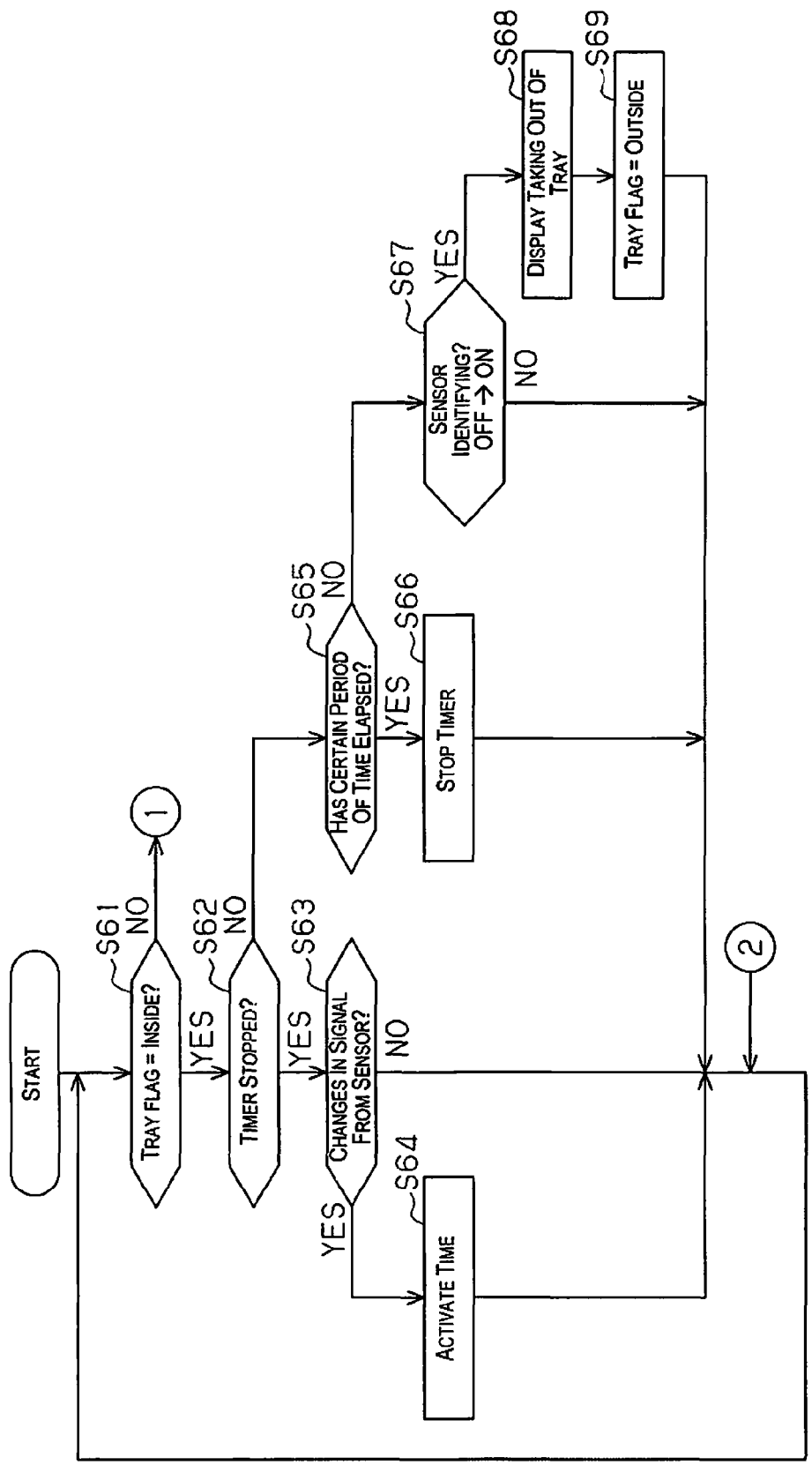
FIG. 17 is a flow chart illustrating a tray control routine.
Figure 18:
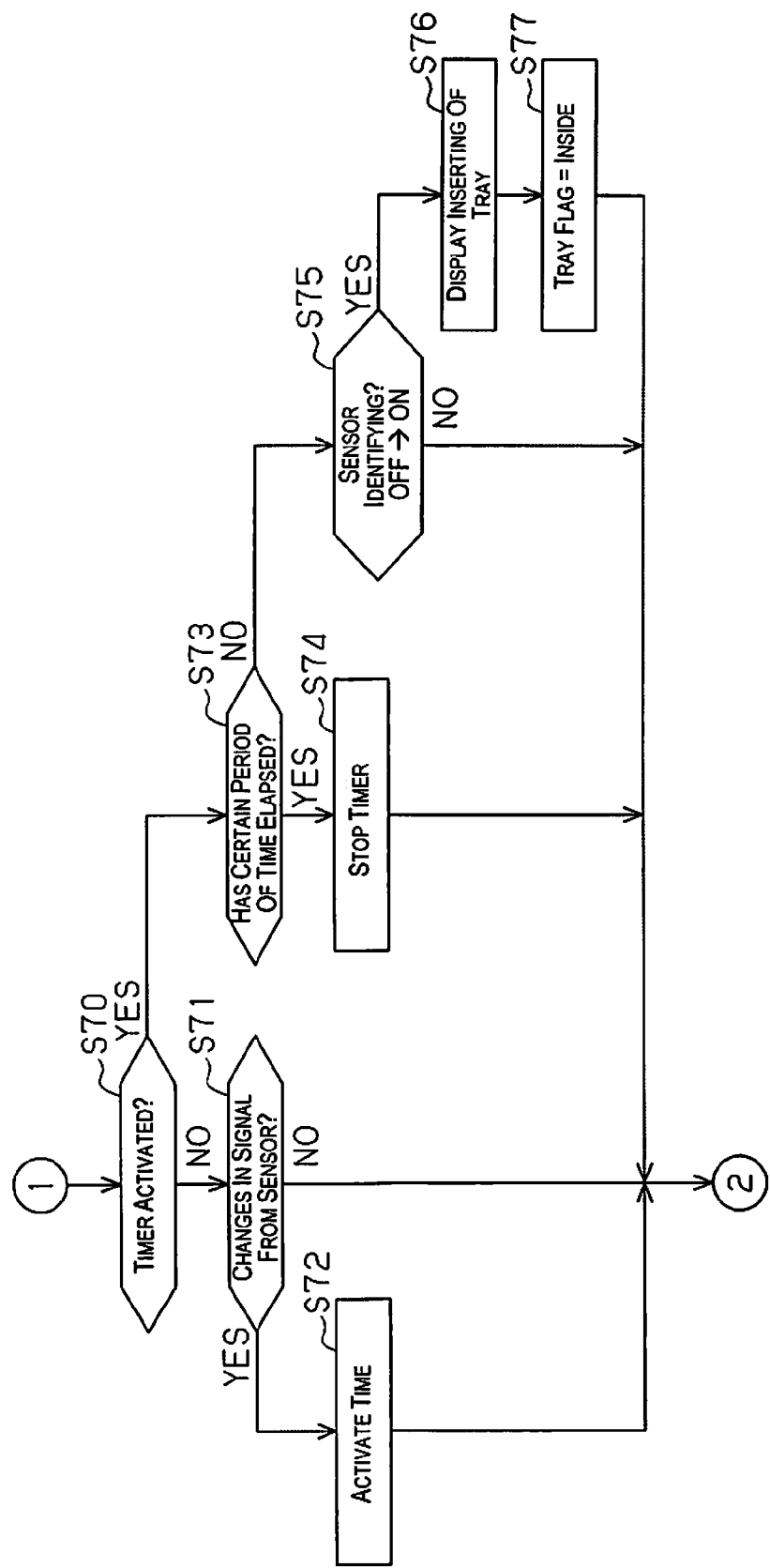
FIG. 18 is a flow chart illustrating a tray control routine.

The computer 70 in the present embodiment executes a tray flag resetting routine shown in FIG. 16 and a processing routine shown in FIG. 17 and FIG. 18. These processes which are executed by the computer 70 will be described below.

The program shown in the flow chart in FIG. 16 is executed using the computer 70 over a designated period of time which includes when the movable tray 17 is driven which is necessary for operating the printer 11. Here, examples of the designated period of time include when the power source is turned on, when the movable tray 17 is being operated before printing, when the movable tray 17 is returned to the setting position after printing, when the motor 43 is driven for other operations in a state where motive power is transferred to the movable tray 17, and the like. Examples of when the movable tray 17 is being operated before printing include when the movable tray 17 retreats to the setting position due to the lower level tray being selected as the origin for supply paper sheets and when the movable tray 17 is moved to the supplying position due to the movable tray 17 (the upper level tray) being selected as the origin for supply paper sheets.

First, in step S51, a tray position detecting operation is performed. Here, the tray position detecting operation is processing of performing detecting of positions when the movable tray 17 is being driven which is necessary in operating the printer 11. There are two patterns in the tray position detecting operation. One is an operation where the movable tray 17 is moved to the setting position and the other one is an operation where the movable tray 17 is moved to the setting position. The former is the same as the operation shown in FIG. 11A and is detecting if the movable tray 17 has reached the supplying position when the drive load (for example, the electric current value) exceeds a threshold when the movable tray 17 hits the separating mechanism 40. The latter is the same as the operation shown in FIG. 11B and is detecting if the movable tray 17 has reached the setting position when the movable tray 17 reaches the setting position and the first sensor 65 switches from off to on.

Next, in step S52, it is determined whether or not the movable tray 17 is detected. The operation transitions to step S53 in a case where the movable tray 17 is detected and the operation transitions to step S54 in a case where the movable tray 17 is not detected.

In step S53, "inside" which is that the movable tray 17 is positioned at an inner section of the apparatus body 12 is set as a tray flag (tray flag TF=1).

In step S54, "outside" which is that the movable tray 17 is positioned at an outer section of the apparatus body 12 is set as the tray flag (tray flag TF=0). In this manner, it is possible for the computer 70 to recognize whether the movable tray 17 is positioned at an inner section or an outer section of the apparatus body 12 using the value of the tray flag.

The processing routine shown in FIG. 17 and FIG. 18 which is executed by the computer 70 will be described next. The computer 70 executes a program shown by the flow chart in FIG. 17 and FIG. 18 in a case where the motor 43 is stopped or the movable tray 17 is not selected as the motive power transfer destination even when the motor 43 is being operated.

First, in step S61, it is determined whether or not the tray flag is "inside" (TF=1). The processing transitions to step S62 if the tray flag is "inside" and, if not, that is, if the tray flag is "outside" (TF=0), the processing transitions to step S70 in FIG. 18. First, a case where the tray flag is "inside" which is when the movable tray 17 is positioned at an inner section of the apparatus body 12 will be described with reference to FIG. 17.

In step S62, it is determined whether or not a timer has stopped. The processing transitions to step S63 if the timer has stopped and the processing progresses to step S65 if the timer has not stopped, that is, if the timer is being activated.

In step S63, it is determined whether or not the signal from the first sensor 65 changes. The signal from the first sensor 65 changes from on to off or changes from off to on in cases where a user moves the movable tray 17. In a case where, for example, a user takes out the movable tray 17, the first sensor 65 first changes from on to off in a process of the operation where the movable tray 17 is taken out. The processing transitions to step S64 in a case where the signal from the first sensor 65 changes in this manner. On the other hand, the processing returns to step S61 in a case where the signal from the first sensor 65 does not change (a negative determination in step S63).

In step S64, the timer 92 is activated. After this, the processing returns to step S61. The timer 92 is activated when the signal from the first sensor 65 changes due to a user moving the movable tray 17. After this, the processing transitions to step S65 when it is determined that the timer has not stopped, that is, the timer is being activated in step S62 (a negative determination in step S62).

Then, in step S65, it is determined whether or not a certain period of time has elapsed. A setting time T1 which is stored in the memory 85 in advance is used as the certain period of time. The processing proceeds to step S66 in a case where the certain period of time has elapsed and the processing transitions to step S67 in a case where the certain period of time has not elapsed.

In step S67, it is determined whether or not the first sensor 65 is identifying. The computer 70 determines whether or not the first sensor 65 switches from off to on. The processing transitions to step S68 if the first sensor 65 switches from off to on and the processing returns to step S61 if the first sensor 65 does not switch from off to on. In a case where a user performs an operation to take out the movable tray 17, the first sensor 65, which is in an on state due to the first section to be identified 17A being identified, initially switches to off, switches to an on state when the second section to be identified 17B is identified after this, and finally switches to an off state. For this reason, in a case where a user performs an operation to take out the movable tray 17, the first sensor 65 switches from off to on when the second section to be identified 17B is identified. As a result, the processing transitions to step S68 when there is a process where the movable tray 17 is taken out.

In step S68, that the tray is taken out is displayed on the display section 14. The computer 70 displays a message of, for example, "the first tray has been taken out" on the display section 14. In addition, a guidance message on the orientation for setting the paper sheets, a guidance message for setting the edge guide 31 for the paper sheets, illustrations for these guidance operations may be displayed. Here, the message which is displayed at this time is equivalent to an example of guidance other than the content which prompts inputting of the medium information (for example, size or type of paper sheets).

Then, in step S69 which is next, the tray flag is updated to "outside" (TF=0).

Here, in a case where a user mistakenly pushes in the movable tray 17, it is determined in step S63 that the signal changes due to the first sensor 65 switching from on to off and the timer 92 is activated (step S64). In this case, since the movable tray 17 is moving to the supply position side, the second section to be identified 17B does not pass through the detection region of the first sensor 65. For this reason, a certain period of time elapses (a negative determination in step S65) without the first sensor 65 switching from off to on (a negative determination in step S67). An operation where a user pushes in the movable tray 17 is not mistakenly detected as the movable tray 17 being taken out. That is, according to the present embodiment, it is possible to correctly determine whether or not there is a tray taking out operation by distinguishing the direction in which a user moves the movable tray 17.

Here, in a case where a particular operation of a user slightly pulling out and returning the movable tray 17 straight to the setting position, the first sensor 65 switches from on to off (an affirmative determination in step S63) when the movable tray 17 is initially pulled out and the timer 92 is activated (step S64).

At this time, in a case where a user arranges the movable tray 17 at the setting position by pushing straight back, there are cases where the first sensor 65 switches from off to on. In this case, the first sensor switches from off to on in step S67 and taking out of the tray is mistakenly detected in step S68. Then, irrespective of the movable tray 17 being at an inner side of the apparatus body 12 due to finally being pushed back, that the tray is taken out is mistakenly displayed on the display section 14 (step S68) and a value where the tray flag is incorrect is updated (step S69).

However, in the present example, the tray flag resetting routine is executed at the designated period of time which includes when the power source is turned on and when the movable tray 17 is driven before and after printing, and it is detected that the movable tray 17 which is in the apparatus body 12 when arranged at the setting position or the supplying position due to the tray position detecting operation (step S51 in FIG. 16). Then, in a case where the movable tray 17 is detected, the tray flag is set as "inside" (TF=1). On the other hand, since it is not possible for the movable tray 17 to be detected (a negative determination in step S52) in a case where the movable tray 17 is at an outer section of the apparatus body 12, the tray flag is set as "outside" (TF=0). In this manner, the tray flag is relatively quickly updated to a correct value.

Processing when the movable tray 17 is in the taking out state will be described next with reference to FIG. 18.

First, in step S70, it is determined whether or not the timer 92 is being activated.

In step S71, it is determined whether or not the signal from the first sensor 65 changes. For example, first, the signal of the first sensor 65 changes from off to on (FIG. 15D→FIG. 15C) due to the first sensor 65 identifying the section to be identified 17B in a process where a user performs an operation where the movable tray 17 is mounted in the apparatus body 12. In a case where the signal of the first sensor 65 changes, there is a transition to step S72. On the other hand, in a case where the signal of the first sensor 65 does not change (a negative determination in step S71), there is a transition to step S61 (FIG. 17)

In step S72, the timer 92 is activated. After this, the processing returns to step S61. The timer 92 is activated when the signal of the first sensor 65 changes in a process where a user operates so as to mount the movable tray 17. After this, when it is determined that the tray flag is not "inside" (that is, "outside") in step S61 (a negative determination in step S61), there is a transition to step S70 which is next. Then, when it is determined that the timer is being activated (an affirmative determination in step S70), there is a transition to step S73.

Then, in step S73, it is determined whether a certain period of time elapses. The setting time T1 which is stored in the memory 85 in advance is used as the certain period of time in the same manner as step S65 described above. The processing proceeds to step S74 in a case where the certain period of time has elapsed and the processing transitions to step S75 in a case where the certain period of time has not elapsed.

In step S75, it is determined whether or not the first sensor 65 is identifying. The computer 70 determines whether or not the first sensor 65 switches from off to on. The computer 70 determines whether or not the first sensor 65 switches from off to on. There is a transition to step S76 when the first sensor 65 switches from off to on and the processing returns to step S61 when the first sensor 65 does not switch from off to on. In a case where an operation is performed where a user mounts the movable tray 17, the first sensor 65 which is in an off state is initially in an on state when the second section to be identified 17B is identified, switches to being off after this, and finally is in an on state when the first section to be identified 17A is identified. For this reason, in a case where an operation is performed where a user mounts the movable tray 17, the movable tray 17 is arranged at the setting position and the first sensor 65 switches from off to on when the first sensor 65 identifies the first section to be identified 17A. As a result, when an operation to mount the movable tray 17 is performed, there is a transition to step S76.

In step S76, that the tray is inserted (mounted) is displayed on the display section 14. The computer 70 display a message such as, for example, "please insert the first tray" on the display section 14. Then, the tray flag is updated to "inside" (TF=1) in step S77 which is next. Then, the inquiry screen 103A (refer to FIG. 10B) is displayed on the display section 14 in the same manner as the first embodiment. The size and quality type of the paper sheets P2, which are accommodated in the movable tray 17 which is mounted, are input by a user operating the operating section 15. The medium information which is input in this manner is written into the setting data D1 to be associated with the movable tray 17 (the first tray).

Here, in a case where a particular operation is performed so that the movable tray 17 is inserted slightly and pulled straight back to the front by a user, the first sensor 65 switches from off to on (an affirmative determination in step S71) when the movable tray 17 is initially slightly inserted and the timer 92 is activated (step S74). At this time, in a case where a user slightly pulls back slightly on the movable tray 17 due to the insertion position, there are cases where the first sensor 65 switches from off to on. In this case, the first sensor 65 switches from off to on in step S75 and inserting of the movable tray 17 is mistakenly detected in step S76. In this case, irrespective of the movable tray 17 being at an outer side of the apparatus body 12 due to finally being pulled back, that the tray is inserted is mistakenly displayed on the display section 14 (step S76) and a value where the tray flag is incorrect is updated.

However, the tray flag resetting routine is executed in the designated period of time and the tray flag is set as "inside" (TF=1) in a case where it is detected that the movable tray 17 is arranged at the setting position or the supply position due to a tray position detecting operation. On the other hand, since it is not possible to detect the movable tray 17 (an affirmative determination in step S52) in a case where the movable tray 17 is at an outer section of the apparatus body 12, the tray flag is set as "outside" (TF=0). In this manner, the tray flag is relatively swiftly updated to a correct value.

According to the embodiment described above in detail, it is possible to obtain the effects shown below.

(7) In addition to the first section to be identified 17A so that it is possible to identify the movable tray 17 which is at the setting position, the second section to be identified 17B is provided at a position which is able to be identified by the first sensor 65 after the first sensor 65 no longer identifies the first section to be identified 17A due to the movable tray 17 moving from the setting position in the taking out direction. The computer 70 detects mounting of the movable tray 17 when the first sensor 65 switches from off (a non-identifying state) to on (an identifying state), to off, and then on when the motor 43 is not driving the movable tray 17. For this reason, it is possible to more correctly detect that a user mounts the movable tray 17 in the apparatus body 12. When there is a configuration where, for example, there is only one of the sections to be identified which is identified at the setting position, the sensor switches from off (a non-identifying state) to on (an identifying state) in a case where a user pulls out the movable tray 17, which is pushed in to the supplying position side, to the setting position. However, in this case, it is not possible to distinguish whether the movable tray 17 is mounted or the movable tray 17 is pulled out from the supplying position side using only the result of the identifying by the sensor. However, since there are two of the sections to be identified 17A and 17B, it is possible to specify the movement direction using the difference in changes of signals from the sensor when the movable tray 17 moves and it is possible to even more correctly detect a user mounting the movable tray 17.

(8) Two of the sections to be identified 17A and 17B are provided and taking out of the movable tray 17 is detected when the first sensor 65 switches from on (an identifying state) to off (a non-identifying state) and to on again when the motor 43 is not driving the movable tray 17. As such, it is possible to more correctly detect a user taking out the movable tray 17. When there is a configuration where, for example, there is only one of the sections to be identified for identifying the setting position, the sensor switches from on to off in a case where a user mistakenly pushes in the movable tray to the supplying position side, but it is not possible to distinguish whether the movable tray is taken out or the movable tray is pushed in using only the result of the identifying by the sensor in this case. However, since there are two of the sections to be identified 17A and 17B, it is possible to detect that the movable tray 17 moves in the taking out direction and it is possible to even more correctly detect a user taking out the movable tray 17.

Here, it is possible to modify the embodiments described above to the following aspects.

Controlling of the motor 43 which drives the movable tray 17 is not limited to feedback control and may be feed forward control. In a case of feed forward control, the speed of the movable tray 17 is monitored and it is necessary that driving of the motor 43 is stopped due to the load exceeding a threshold if the speed is less a threshold (if exceeded on the slow side). In addition, the feedback control may be voltage control and there may be a configuration where driving of the motor is stopped if a voltage exceeds a threshold. In this manner, it is possible to adopt a method for determining according to the method for control which is used as the method for determining that the load which is applied to the motor increases and exceeds a threshold.

The regulating section is not limited to the separating mechanism 40 and may be a dedicated stopper which regulates the movable tray 17 at the supplying position.

In each of the embodiments described above, identifying the setting position, identifying the supplying position, detecting taking out, and detecting mounting of the movable tray 17 are performed, but there may be a configuration where identifying the setting position and identifying the supplying position is performed and detecting taking out and detecting mounting are not performed. Even with this configuration, it is possible to identify the setting position and the mounting position using sensors which are fewer in number than the number of position states which are targets for detection. In addition, there may be a configuration where one of detecting taking out and detecting mounting is added to identifying the setting position and identifying the supplying position. Even with this configuration, it is possible to perform three types of detection which include the setting position and the mounting position using sensors which are fewer in number than the number of position states which are targets for detection. Furthermore, there may be a configuration where detection of at least one other target for detection is added to detection of the four types of the setting position, the supplying position, taking out, and mounting.

In the second embodiment described above, the number of sections to be identified is two but a plurality of three or more of the sections to be identified may be provided. That is, a plurality of the second sections to be identified may be provided. For example, a plurality of the second sections to be identified may be provided on a side section of the movable tray 17 at positions on the insertion direction side of the first section to be identified 17A.

In addition, for example, the second sections to be identified are provided on the side section of the movable tray 17 on both sides of a position on the insertion direction Y1 side and a position on the taking out direction Y2 side with regard to the first section to be identified 17A, and the number of the second sections to be identified which are provided at the position on the insertion direction Y1 side is more than the number of the second sections to be identified which are provided at the position on the taking out direction Y2 side. Then, movement of the movable tray 17 in the insertion direction Y1 and movement of the movable tray 17 in the taking out direction Y2 may be distinguished and detection of each of mounting and taking out may be performed due to the difference in the number of the sections to be identified which are identified when the movable tray 17 moves from the setting position. In this case, it is possible to correct detect taking out due to the number of the sections to be identified on the insertion direction Y1 side being higher than the number of the sections to be identified on the taking out direction Y2 side. In a case where, for example, a user pulls back the movable tray 17 from an intermediate position, which is between the setting position and the supplying position, to the setting position, the number of the second sections to be identified which are identified by the first sensor 65 is different depending on where the intermediate position is at this time. In contrast to this, it is possible to correctly detect mounting from the number of identifications since all of the second sections to be identified which are positioned on the insertion direction Y1 side of the first section to be identified 17A are identified by the first sensor 65 when the movable tray 17 is mounted.

The section to be identified which is the target for detection by the first sensor may be a recess section or a hole instead of a protuberance.

In this case, the first sensor 65 is off due to an identifying state where the section to be identified is identified and is on due to a non-identifying state. In addition, the first sensor 65 may be a noncontact sensor instead of a contact sensor. As the noncontact sensor, examples such as an optical sensor or a magnetic sensor are possible. In a case of a noncontact sensor, the section to be identified is a surface to be identified such as a light reflecting surface, a light absorbing surface, a surface which is magnetic, or a surface of a magnetic body instead to the protuberance.

The second sensor 66 may be a contact sensor instead of a noncontact sensor such as an optical sensor.

The transport motor 43 which is the motive power source for the transporting system is used as the motive power source for the movable tray 17 but a dedicated motor may be used.

The number of levels for the supply trays is not limited to two levels and the number of levels for the supply trays may be a plurality of levels of three or more levels. In addition, the movable tray is not limited to one level and may be two or more levels. Furthermore, the movable tray 17 may be arranged at the lower side of another supply tray. In addition, there may be a configuration with only one level which is the movable tray 17. In addition, there may be a configuration where the movable tray 17 is inserted and extracted at a back surface side of the apparatus body 12 or there may be a configuration where the movable tray 17 is inserted and extracted at a side surface side instead of the configuration where the movable tray 17 is inserted and extracted at the front surface side of the apparatus body 12.

Instead of the operating section 15 or in addition to the operating section 15 with the display section 14 as a touch panel, there may be a configuration where a touch panel is an example of the operating section.

Each of the functional sections which configure the control section may be realized by software using a CPU which executes programs, may be realized by hardware using an electronic circuit such as an ASIC, or may be realized by software and hardware working together.

The printing apparatus may be an ink jet printer, a dot impact printer, or a laser printer as long as printing on the medium such as the paper sheets P is possible. In addition, the printing apparatus is not limited to a printer which is provided with only a printing function and may be a multifunctional apparatus.

Furthermore, the printing apparatus is not limited to a serial printer and may be a line printer or a page printer.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing apparatus comprising:
a medium accommodating section configured to be movable and accommodate a medium, the medium accommodating section having a section to be identified configured to identify a position of the medium accommodating section, the medium accommodating section being configured to move between a setting position where the medium accommodating section is set in a body of the printing apparatus and a supplying position where the medium which is accommodated in the medium accommodating section is supplied;
a sensor configured to identify the section to be identified;
a driving section configured to drive the medium accommodating section to move between the setting position and the supplying position;
a regulating section configured to regulate further movement when the medium accommodating section reaches the supplying position; and
a control section configured to detect that the medium accommodating section is at the setting position by the sensor identifying the section to be identified and detect that the medium accommodating section has reached the supplying position when the medium accommodating section hits the regulating section and a drive load on the driving section exceeds a threshold,
when the driving section is not driving the medium accommodating section, the control section being further configured to detect taking out of the medium accommodating section when the sensor switches from an identifying state where the section to be identified is identified to a non-identifying state where the section to be identified is not identified, and detect mounting of the medium accommodating section when the sensor switches from the non-identifying state to the identifying state.

2. The printing apparatus according to claim 1, wherein the control section is further configured to detect taking out of the medium accommodating section when the driving section drives the medium accommodating section to move to the setting position and the sensor is not in the identifying state even after driving with a predetermined driving amount when the sensor switches from the identifying state where the section to be identified is identified to the non-identifying state where the section to be identified is not identified while the driving section is not driving the medium accommodating section.

3. The printing apparatus according to claim 2, wherein in a case where the section to be identified is a first section to be identified, the medium accommodating section further has at least one second section to be identified that is provided such that a first number of the at least one second section which is provided at a position more to an insertion direction side than the first section to be identified of the medium accommodating section is more than a second number of the at least one second section which is provided at a position on a taking out direction side, wherein
the control section is further configured to detect mounting of the medium accommodating section when a total number of the at least one second section to be identified which is provided on the insertion direction side and the first section to be identified is the same as a number of times that the sensor is in the identifying state while the driving section is not driving the medium accommodating section.

4. The printing apparatus according to claim 2, wherein in a case where the section to be identified is a first section to be identified, the medium accommodating section further has at least one second section to be identified that is provided such that a first number of the at least one second section which is provided at a position more to an insertion direction side than the first section to be identified of the medium accommodating section is more than a second number of the at least one second section which is provided at a position on a taking out direction side, wherein
the control section is configured to detect taking out of the medium accommodating section when the sensor switches from the identifying state to the non-identifying state when the driving section is not driving the medium accommodating section, and the first number of the at least one second section to be identified which is provided on the insertion direction side is the same as a number of at least one time that the sensor is in the identifying state.

5. The printing apparatus according to claim 2, wherein in a case where the medium accommodating section is a first medium accommodating section and the sensor is a first sensor, the printing apparatus further comprises a second medium accommodating section configured to accommodate a medium, and a second sensor configured to identify an end portion of the second medium accommodating section on a downstream side of an insertion direction into the body of the printing apparatus when the second medium accommodating section is mounted in the body of the printing apparatus,
the control section is further configured to detect mounting of the second medium accommodating section into the body of the printing apparatus when the second sensor identifies the end portion of the second medium accommodating section.

6. The printing apparatus according to claim 2, further comprising:
a display section configured to prompt inputting of medium information which includes at least one of a type and a size of the medium using a display;
an operating section configured to be operated in order to input the medium information; and
a memory section configured to store the medium information so as to be associated with the medium accommodating section which is mounted, wherein
the control section is further configured to display content which prompts inputting of the medium information, which relates to the medium which is accommodated in the medium accommodating section which is mounted, on the display section when detecting that the medium accommodating section is mounted in the body of the printing apparatus, and store the medium information which is input from the operating section in the memory section to be associated with the medium accommodating section where mounting is detected.

7. The printing apparatus according to claim 6, wherein the control section is further configured to display guidance other than the content which prompts inputting of the medium information, on the display section, when detecting that the medium accommodating section is taken out of the printing apparatus body.

* * * * *